(12) United States Patent
Yu et al.

(10) Patent No.: US 6,454,421 B2
(45) Date of Patent: Sep. 24, 2002

(54) DUAL AXIS MICRO MACHINED MIRROR DEVICE

(75) Inventors: Duli Yu, Sugar Land, TX (US); Lianzhong Yu, Redmond, WA (US); Howard Goldberg, Sugar Land, TX (US); Martin Schmidt, Reading, MA (US)

(73) Assignee: Input/Output, Inc., Stafford, TX (US)

(*) Notice: Subject to any disclaimer, the term of this patent is extended or adjusted under 35 U.S.C. 154(b) by 0 days.

(21) Appl. No.: 09/873,054

(22) Filed: Jun. 1, 2001

Related U.S. Application Data

(63) Continuation-in-part of application No. 09/352,835, filed on Jul. 13, 1999, now Pat. No. 6,315,423.

(51) Int. Cl.⁷ .............................................. G02B 7/182
(52) U.S. Cl. ...................... 359/872; 359/224; 359/298; 359/876; 310/309
(58) Field of Search ................................. 359/871, 872, 359/212, 214, 223, 224, 290, 298, 876; 310/309

(56) References Cited

U.S. PATENT DOCUMENTS

| | | | |
|---|---|---|---|
| 4,317,611 A | 3/1982 | Petersen | 359/214 |
| 5,629,790 A | 5/1997 | Neukermans et al. | 359/198 |
| 5,914,801 A | 6/1999 | Dhuler et al. | 359/230 |
| 5,966,230 A | 10/1999 | Swartz et al. | 359/196 |
| 6,044,705 A | 4/2000 | Neukermans et al. | 73/504.02 |
| 6,059,188 A | 5/2000 | DiFazio | 235/462.36 |
| 6,102,294 A | 8/2000 | Swartz et al. | 235/462.36 |

FOREIGN PATENT DOCUMENTS

EP    0 731 417 A2    9/1996

*Primary Examiner*—Mark A. Robinson
(74) *Attorney, Agent, or Firm*—Madan, Mossman & Sriram, P.C.

(57) ABSTRACT

A micro machined mirror assembly is provided that includes a micro machined top cap, mirror, and bottom cap mounted onto a ceramic substrate. The micro machined mirror is resiliently supported by a pair of T-shaped hinges. At least two electrostatic force application pads are disposed to rotate the mirror about a primary axis and about a secondary axis.

25 Claims, 21 Drawing Sheets

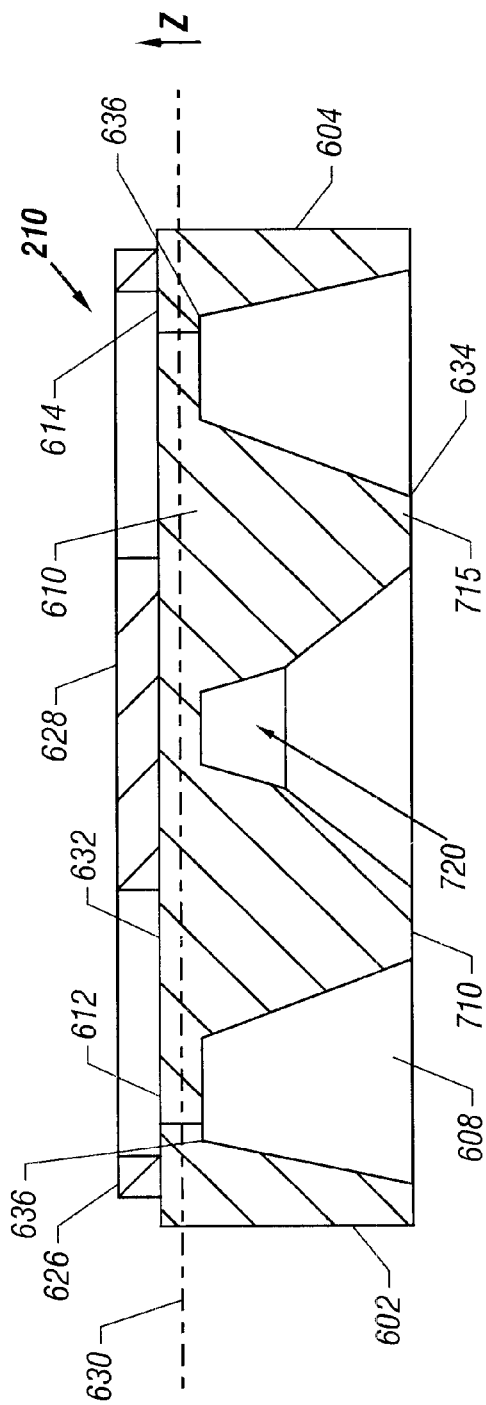
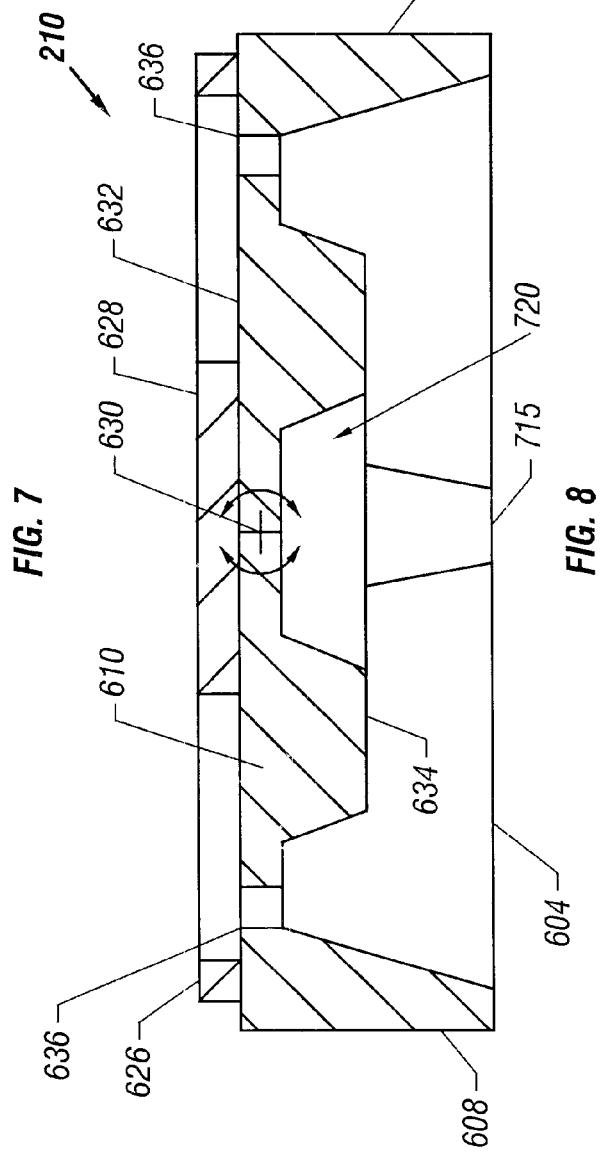

DUAL AXIS MICRO MACHINED MIRROR DEVICE

CROSS REFERENCE TO RELATED APPLICATIONS

This application is a continuation-in-part of U.S. patent application Ser. No. 09/352,835 filed on Jul. 13, 1999, now U.S. Pat. No. 6,315,423, the entire specification of which is hereby incorporated herein by reference, is related and to PCT application Ser. No. PCT/US00/18998 filed on Jul. 13, 2000, the entire specification of which is hereby incorporated herein by reference, and to U.S. patent application Ser. No. 09/352,025 filed on Jul. 13 1999, the entire specification of which is hereby incorporated herein by reference, and to PCT application Ser. No. PCT/US00/19127 filed on Jul. 13, 2000, the entire specification of which is hereby incorporated herein by reference.

BACKGROUND OF THE INVENTION

This invention relates generally to micro-machined three-dimensional structures, and in particular to micro-machined mirrors for use in optical readers, such as bar code readers or scanners.

Conventional bar code scanners are used to scan a surface with a laser beam. Conventional bar code scanners further typically utilize mirrors that are oscillated to permit the laser beam to scan. Conventional mirrors for bar code scanners are relatively large and imprecise.

In order to manufacture smaller and more precise bar code mirrors, micro-machining processes have been used in which a silicon substrate is micro-machined to produce a mirror. However, conventional micro-machined mirrors and their manufacturing processes suffer from a number of limitations. Prior art micro-machined mirrors do not provide appropriate compliance in all directions of the movement of the mirror. Such mirrors typically are not sufficiently shock resistant or able to operate over wide ranges of temperature over extended use.

Various known devices include a dual axis mode of operation whereby a mirror is rotated about a primary and a secondary axis. The typical device, however, requires a dual gimbaled structure having a gimbaled mirror coupled to a gimbaled support structure. The use of multiple gimbal couplings suffers from high cost and complex manufacturing. Typical devices attempting dual axis operation utilizing typical single point gimbal would suffer from component fatigue due to high material stress associated with the gimbal bending movements that result from rotational movement of the mirror about a secondary axis. Also, these single-gimbal dual axis devices typically suffer from compromised performance in terms of limited degree of rotational angle about the secondary axis per unit of driving force (e.g. electrostatic or magnetic).

The present invention provides micro-machined mirror devices which overcome one or more limitations of the existing micro-machined devices.

SUMMARY OF THE INVENTION

According to one aspect of the present invention, a mirror assembly is provided that includes a mass having having a first axis and a second axis, a pair of T-shaped hinges attached to a support structure supporting said mass, each T-shaped hinge having a first leg member attached to the mass and a T-member attached to the leg and to the support structure at opposite ends of the T-member, said T-member and leg member capable of torsional and translational movement, and at least two devices operatively associated with the mass and located to apply force to the mass, the capable of rotating the mass about the to rotate the mass about the first and second axes.

According to another aspect of the present invention, a method is provided for supporting a mass. The method includes supporting the mass with a pair of T-shaped hinges attached to a support structure, each T-shaped hinge having a first leg member attached to the mass and a T-member attached to the leg and to the support structure at opposite ends of the T-member, said T-member and leg member capable of torsional and translational movement, oscillating the mass about a first axis with at least two devices capable of applying force to the mass, and oscillating the mass about a second axis with the at least two devices.

BRIEF DESCRIPTION OF THE DRAWINGS

FIG. 7 is a cross-sectional view of the mirror of FIG. 6.

FIG. 8 is a cross-sectional view of the mirror of FIG. 6.

DETAILED DESCRIPTION OF THE PREFERRED EMBODIMENTS

A mirror assembly for use in a bar code reader is provided. The mirror assembly preferably includes a micro-machined three-dimensional mirror supported generally by a pair of "T" shaped hinges in a support structure. The mirror assembly further preferably includes one or more travel stops for limiting the movement of the mirror. The mirror assembly further preferably includes one or more tapered edge surfaces and cut-outs for minimizing clipping of incident and reflected laser beams.

Figure 1:
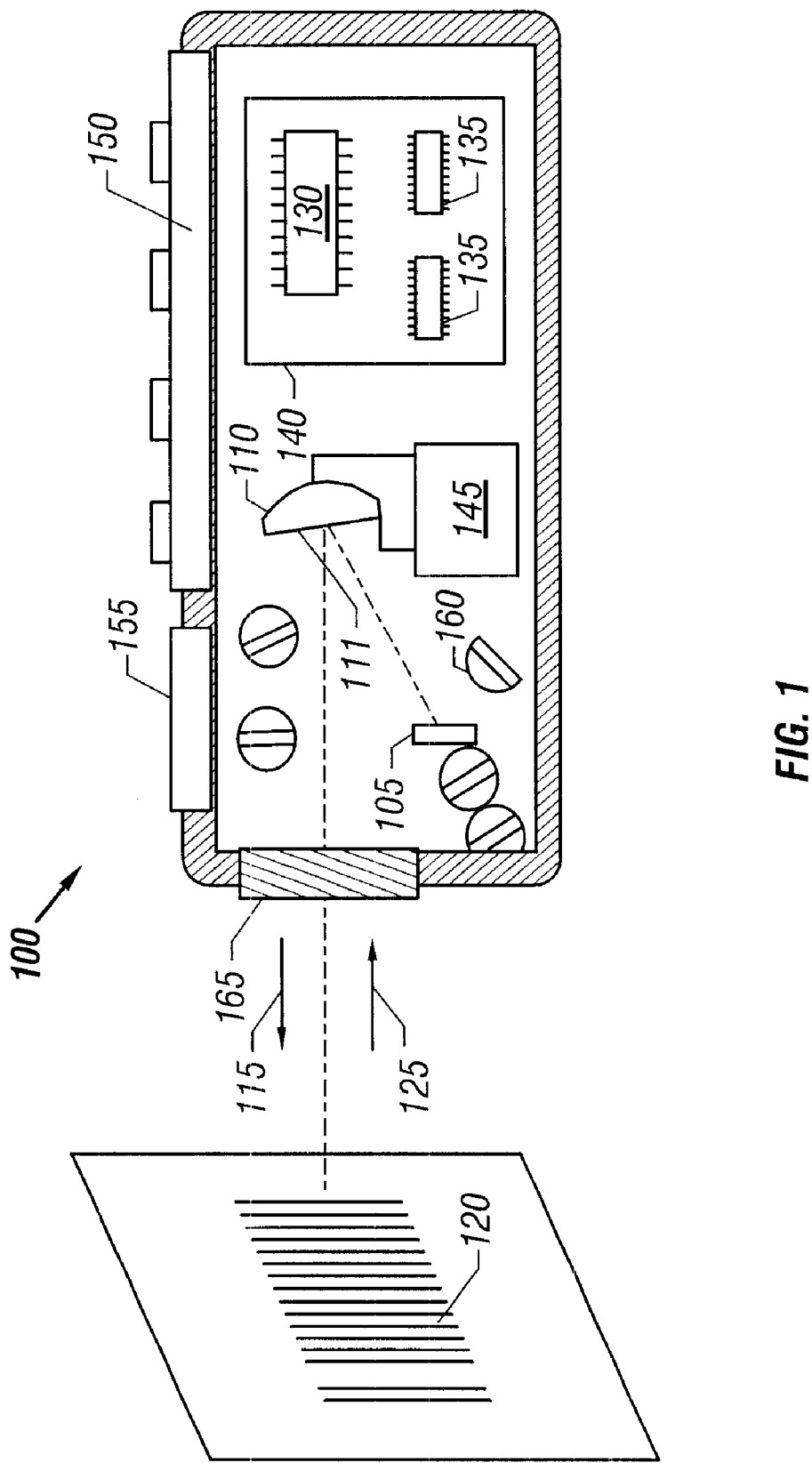
FIG. 1 is a cross section view of a laser scanning device according to the present invention.

FIG. 1 is a cross section view of a laser scanning device such as a bar code scanner 100 having a light beam 115 that emanates from the device to strike a target 120. The light beam is reflected or scattered by the target 120. The bar code scanner 100 includes a laser beam source 105 and a mirror assembly 110. During the operation of the bar code scanner 100, the optically reflective portion 111 of the mirror assembly 110 is preferably oscillated to permit the laser beam 115 to scan a surface, such as a bar code symbol 120, by reflecting the laser beam 115 off of the optically reflective portion 111 of the mirror assembly 110. The reflected light 125 enters the bar code scanner 100 through a window 165 and is detected by a light detector 160. The laser beam source 105 may comprise any number of conventional commercially available devices to generate the laser beam 115.

The bar code scanner 100 may include additional features for user interface, control and data processing. These features may comprise a processor 130 and memory device 135 as part of a central processing unit 140, a controller 145 for generating voltage used to oscillate the mirror 110, a data entry device such as a keypad 150 and a data display device such as a liquid crystal display 155. The mirror assembly 110 made according to the present invention is described below in reference to FIGS. 2–19.

Figure 2:
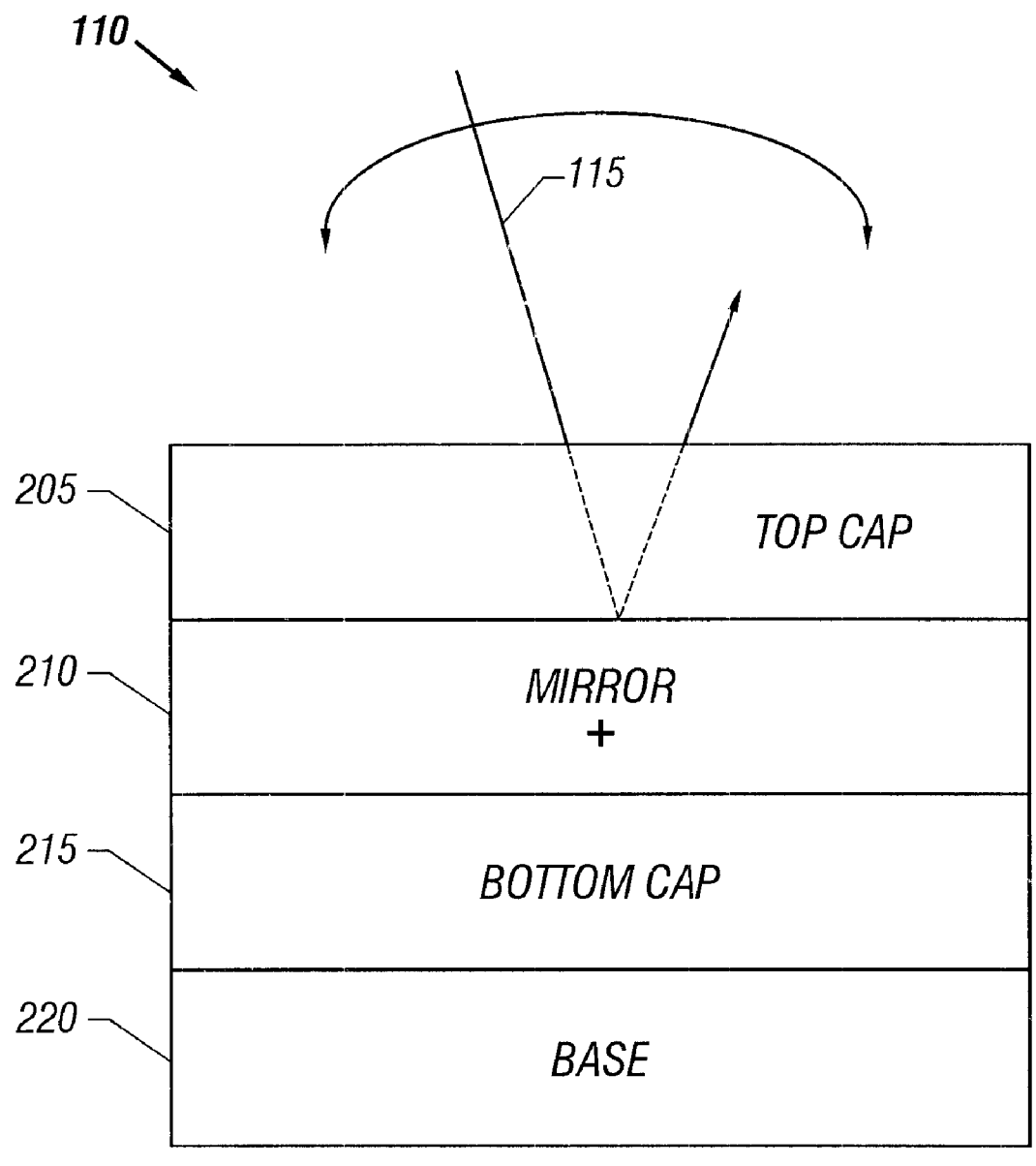
FIG. 2 is a schematic side view of a preferred embodiment of the mirror assembly of FIG. 1.

Referring to FIG. 2, in a preferred embodiment, the mirror assembly 110 includes a top cap 205, a mirror 210, a bottom cap 215, and a base member 220. The top cap 205 includes an opening that permits the laser beam 115 to reflect off of the mirror 210. In this manner, the mirror 210 is surrounded and protected by the top cap 205 and the bottom cap 215. The sub-assembly that includes the top cap 205, mirror 210 and bottom cap 215 is formed and then mounted onto the base member 220.

The top cap 205 and bottom cap 215 may be fabricated from any number of conventional commercially available materials such as, for example, silicon glass, ceramic or plastic. In a preferred embodiment, the top cap 205 is fabricated by micro-machining a silicon wafer.

Figure 3:
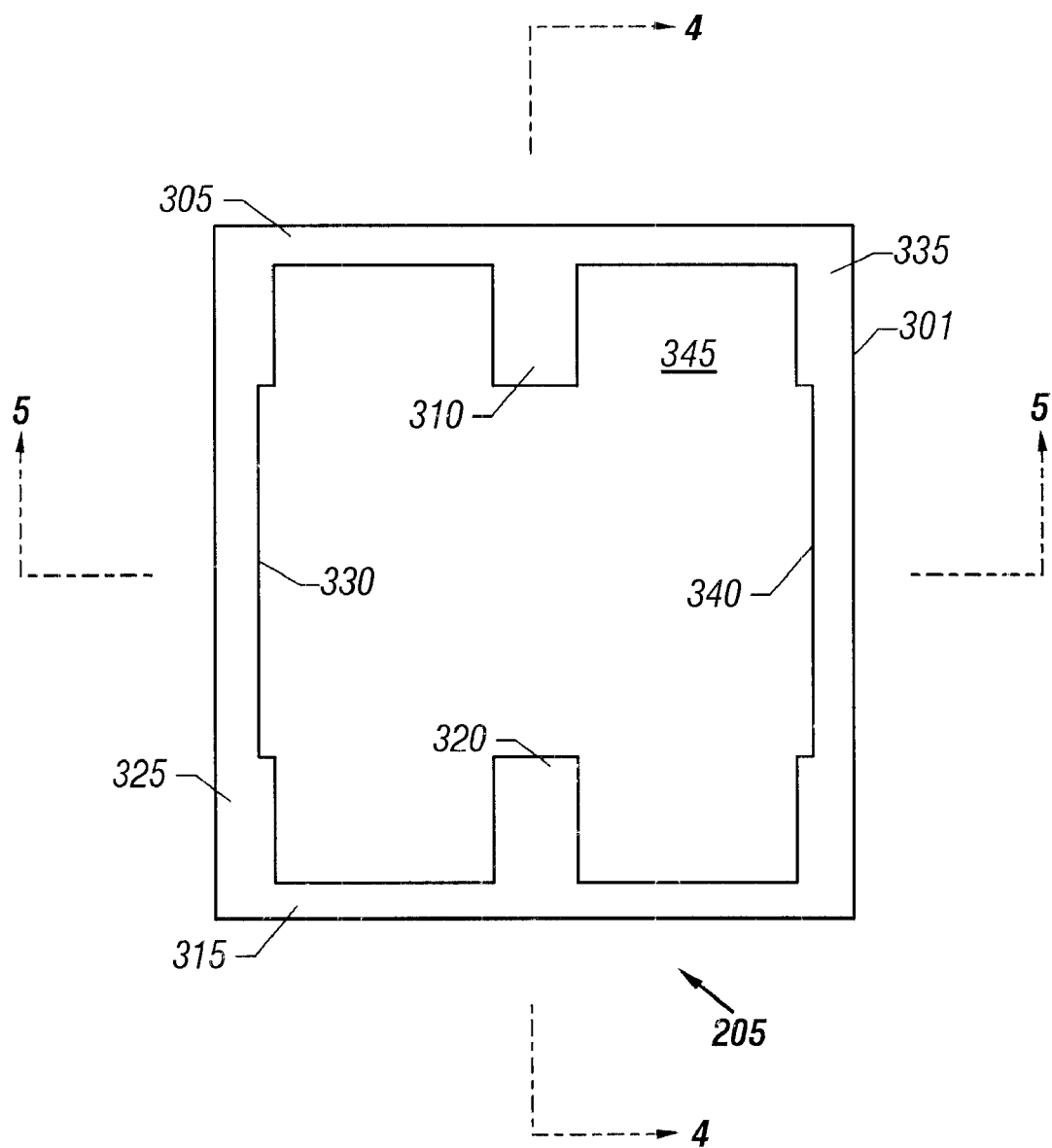
FIG. 3 is a top view of the top cap of the mirror assembly of FIG. 2.
Figure 4:
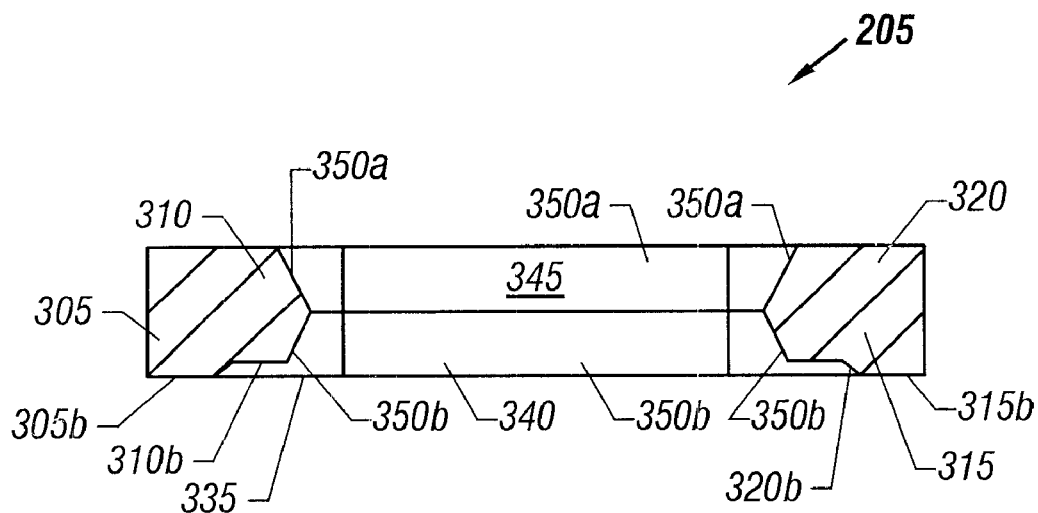
FIG. 4 is a cross-sectional view of the top cap of FIG. 3.
Figure 5:
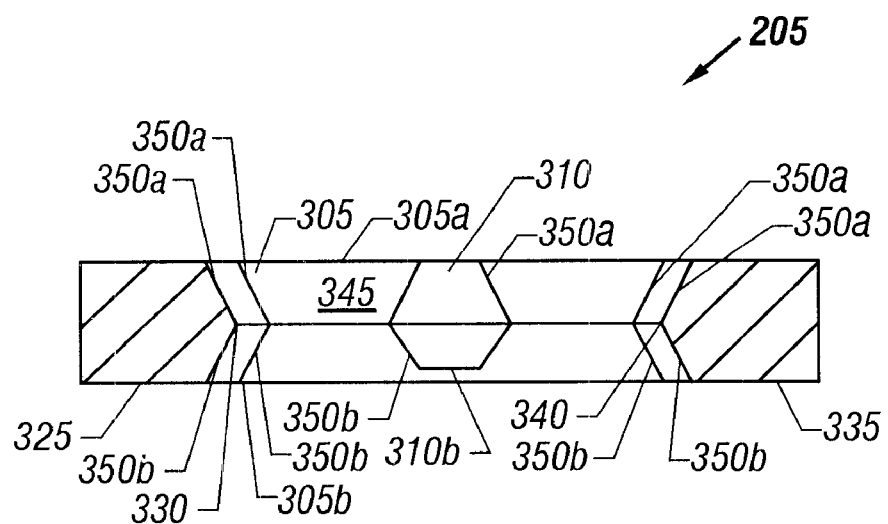
FIG. 5 is a cross-sectional view of the top cap of FIG. 3.

FIGS. 3–5 show various views of a preferred embodiment of the top cap 205 which has a frame 301 that includes a top, bottom, left and right support members 305, 315, 325 and 335. Top and bottom travel stop members 310 and 320 are coupled respectively to the top and bottom support members 305 and 315. The left and right support members 325 and 335 include corresponding left and right rim cutouts 330 and 340 for minimizing clipping of the incident light.

The top cap frame 301 provides an overall support structure for the top cap 205. The thickness of the frame 301 may range, for example, from about 400 to 600 microns with a preferred thickness ranging from about 390 to 400 microns in order to provide a compact structure having a low mass.

The top travel stop 310 preferably limits the motion of the reflective portion of the mirror 210 in the direction normal to the plane of the reflective portion of the mirror 210 (the Z-direction). The top travel stop 310 preferably extends in substantially orthogonal direction from the top support member 305. In a preferred embodiment, the top travel stop 310 is positioned within the plane of the top support member 305. The thickness of the top travel stop 310 may range, for example, from about 340 to 580 microns. In a preferred embodiment, the thickness of the top travel stop 310 ranges from about 350 to 380 microns in order to provide optimum shock protection, freedom of motion, and a compact structure having a low mass.

Referring to FIG. 4, in a particularly preferred embodiment, the bottom surface 310b of the top travel stop 310 is recessed below the level of the bottom surface 305b of the top support member 305. In this manner, the bottom surface 310b of the top travel stop 310 is preferably positioned above the level of the reflective surface of the mirror 210. The length of the top travel stop member 310 may range, for example, from about 800 to 2800 microns. In a preferred embodiment, the length of the top travel stop member 310 ranges from about 2000 to 2500 microns. In a particularly preferred embodiment, the length of the top travel stop member 310 is selected to overlap with the mirror collection plate 610 of the mirror by about 300 microns.

The bottom travel stop 320 extends in a substantially orthogonal direction from the bottom support member 315 and is substantially identical to the top travel stop 310. An opening 345 permits light to reflect off of the reflective surface of the mirror 210. The opening 345 preferably includes a left rim cut out 330 and a right rim cut out 340. The left and right rim cut outs, 330 and 340, are preferably positioned on opposite sides in surrounding relation to the reflective surface of the mirror 210. In this manner, the left and right rim cut-outs, 330 and 340, provide optical access to the reflective surface of the mirror 210.

In a preferred embodiment, the top cap frame 301, travel stops 310 and 320, rim cut outs 330 and 340, and the opening 345 all include tapered edges, 350A and 350B, to facilitate optical access to the reflective surface of the mirror 210 (FIG. 5). The taper angle of the tapered edges, 350A and 350B, preferably ranges from about 50 to 60 degrees in order to optimally facilitate the reflection of laser light transmitted at an angle towards the edge portions of the reflective surface of the mirror 210.

Figure 6:
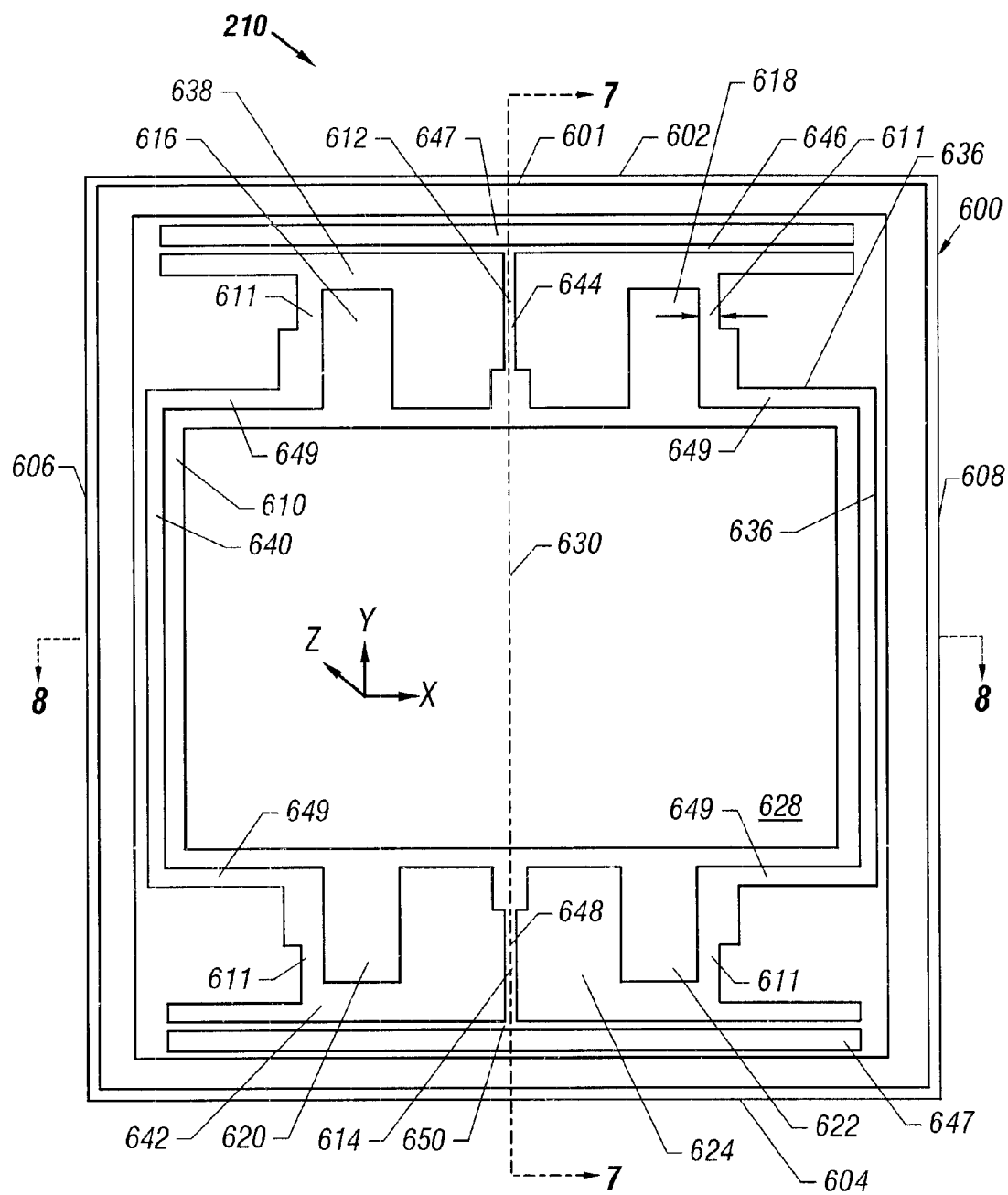
FIG. 6 is a top view of the mirror of the mirror assembly of FIG. 2.

FIG. 6 shows a top view of a mirror or mirror assembly 210 made according to one embodiment of the present invention. The mirror 210 includes a frame or mirror support structure 600 having support members 602, 604, 606 and 608. The mirror 210 further comprises a mirror collection plate 610 with a reflective surface 628, a top T-shaped hinge 612, a bottom T-shaped hinge 614, a top left travel stop finger 616, a top right travel stop finger 618, a bottom left travel stop finger 620, a bottom right travel stop finger 622, an opening 624, a conductive layer 626, and a reflective surface 628.

The mirror frame 600 provides the overall support structure for the mirror 210. The thickness of the frame 600 may range, for example, from about 400 to 600 microns with a preferred thickness ranging from about 400 to 450 microns in order to provide a compact structure having a low mass. In a preferred embodiment, the support members 602, 604, 606, and 608 provide effective beam lengths ranging from about 500–2500 microns and cross sections of about 8,000 microns$^2$ to 160,000 microns$^2$ in order to optimally absorb shock loads of about 2000g/0.5 mS half sine wave input.

The mirror collection plate 610 is coupled to the top T-shaped hinge 612 and the bottom T-shaped hinge 614. In this manner, the mirror collection plate 610 rotates about the axis 630 i.e. has torsional movement about such axis. In a preferred embodiment, the axis 630 is positioned substantially along the centerline of the mirror collection plate 610 and is coincident with the center of the T-shaped hinges, 612 and 614, thereby providing a common axis of rotation for the springs. The reflective surface 628 is coupled to the top 632 of the mirror collection plate 610. In this manner, rotation of the mirror collection plate 610 about the axis 630 causes laser light from a stationary laser to reflect off of the reflective surface 628 in a plurality of directions.

The thickness of the mirror collection plate 610 may range, for example, from about 100 to 600 microns with a preferred thickness ranging from about 100 to 250 microns to provide a low mass and maximize the effective natural frequency of the mirror 210.

The reflective surface 628 may be comprised of any number of conventional commercially available optically reflective surfaces such as, for example, gold, silver or aluminum. In a preferred embodiment, the reflective surface 628 comprises gold in order to optimize the amount of optical energy that is reflected. In a preferred embodiment, the surface roughness of the reflective surface 628 is less than about 0.1 wavelengths of the reflected light in order to optimize the amount of optical energy that is reflected.

Figure 9:
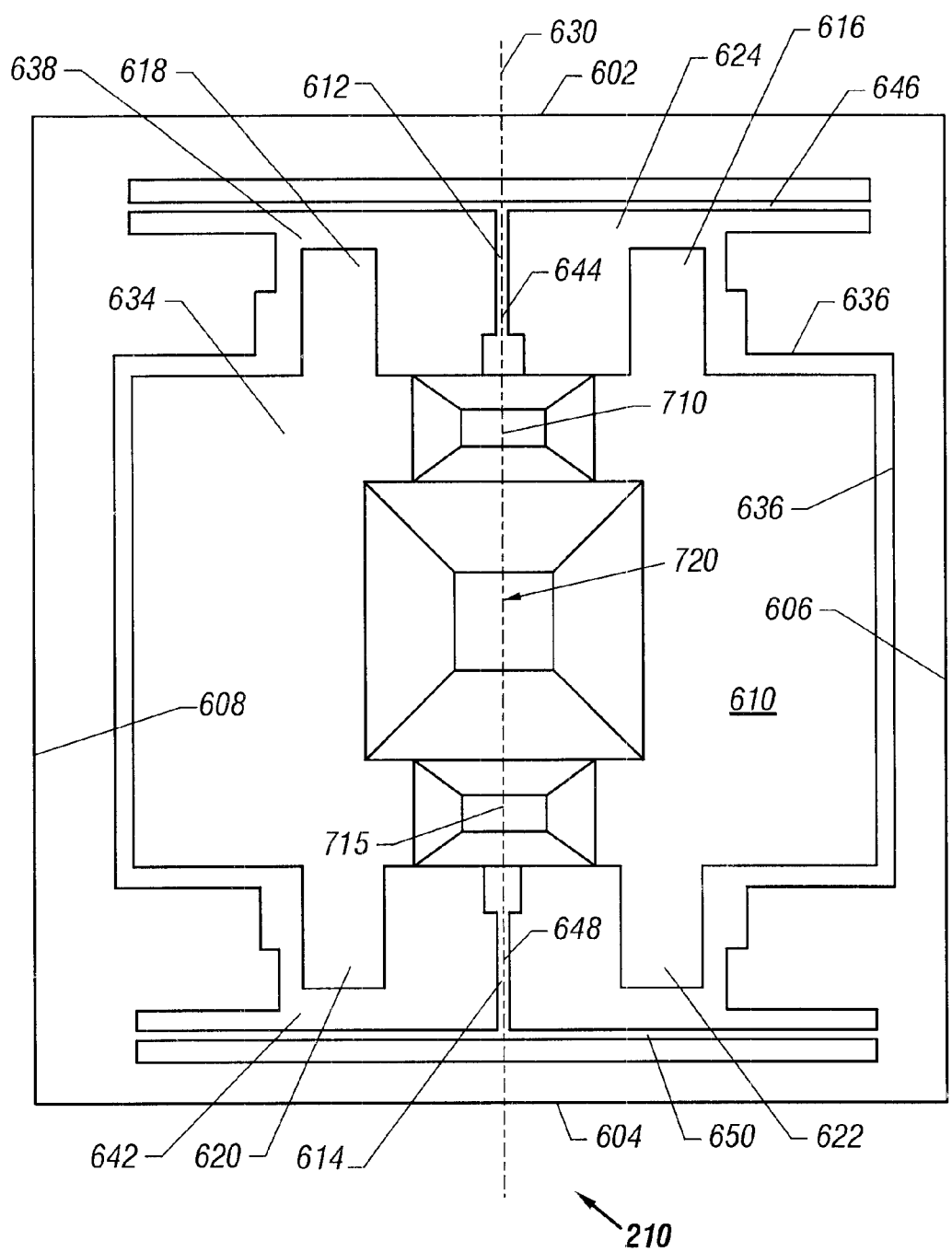
FIG. 9 is a bottom view of the mirror of FIG. 6.

The FIGS. 7 and 8 show cross-sectional views of the mirror of FIG. 6 and FIG. 9 shows a bottom view of the mirror of FIG. 6. As illustrated in FIGS. 7–9, in a preferred embodiment, the bottom 634 of the mirror collection plate 610 includes a top travel stop 710, a bottom travel stop 715, and a cavity 720. The top travel stop 710 extends from the bottom 634 of the mirror collection plate 610. The top travel stop 710 preferably limits movement of the mirror collection plate 610 in the z-direction. The top travel stop 710 preferably extends from the bottom 634 of the mirror collection plate 610 in a substantially orthogonal direction. The top travel stop 710 may extend from the bottom 634 of the mirror collection plate 610 for a distance ranging, for example, from about 200 to 400 microns with a preferred distance ranging from about 200 to 250 microns to optimally limit movement of the mirror collection plate 610. In a preferred embodiment, the top travel stop 710 is centered about the axis 630 and is positioned adjacent to and on one side of the cavity 720. The bottom travel stop 715 is preferably identical to the top travel stop 710 described above.

The cavity 720 extends into the bottom of the mirror collection plate 610, which reduces the mass of the mirror collection plate 610. In this manner, the droop of the mirror 210 is reduced. In a preferred embodiment, the depth and volume of the cavity 720 ranges from about 200 to 500 microns and $8 \times 10^6$ to $1 \times 10^9$ microns.$^3$ In a preferred embodiment, the cavity 720 is centrally positioned along the axis 630 and within the back side 634 of the mirror collection plate 610.

For typical bar code scanner applications, the rotational accuracy of the laser beam may be required to be within 1.3° when the mirror collection plate 610 is subjected to an across-the-hinge self-induced gravity torque. Where torque T=mg*h/2, with mg=mirror collection plate weight and h=mirror collection plate thickness. The mirror accuracy is a function of the pointing accuracy and mirror droop. The torsional spring constant $K_r$ of the T-shaped hinges, 612 and 614, is determined by the resonant frequency F of the mirror collection plate 610 and the size and mass of the mirror collection plate 610. The mirror tilt angle θ due to a gravity torque is determined by the relation, $\theta = T/K_r$. Consequently, the thickness and mass of the mirror collection plate 610, are preferably selected to provide a mirror tilt angle less than 1.3°. In a preferred embodiment, the thickness and mass of the mirror collection plate 610 are reduced by reducing the thickness of the mirror collection plate 610 and by providing one or more cavities in the mirror collection plate 610.

The top T-shaped hinge 612 is coupled to the left support member 606, the right support member 608, and the top portion of the mirror collection plate 610. The top T-shaped hinge 612 preferably includes a vertical support member 644 (beam or leg) and a second or horizontal support member 646 (T-member). The horizontal support member 646 preferably is supported at opposite ends by the left support member 606 and the right support member 608. In a preferred embodiment, the horizontal support member 646 is substantially orthogonal to both the left support member 606 and the right support member 608. The vertical support member 644 is coupled to the horizontal support member 646. In a preferred embodiment, the vertical support member 644 is substantially orthogonal to the horizontal support member 646. The vertical support member 644 is coupled to the mid-point of the horizontal support member 646. The vertical support member 644 is positioned along the axis 630. The length, width and thickness of the vertical support member 644 may range, for example, from about 100 to 2500 microns, 2 to 100 microns and 2 to 100 microns, respectively. In a preferred embodiment, the length, width and thickness of the vertical support member 644 range from about 800 to 1000 microns, 8 to 15 microns and 8 to 15 microns, respectively. The torsional spring constant of the vertical support member 644 may range, for example, from about $2 \times 10^{-9}$ to $10 \times 10^{-7}$ lbf-ft/radian. In a preferred embodiment, the torsional spring constant of the vertical support member 644 ranges from about $2 \times 10^{-8}$ to $10 \times 10^{-8}$ lbf-ft/radian. The length, width and thickness of the horizontal support member 646 may range, for example, from about 500 to 4500 microns, 6 to 100 microns and 6 to 100 microns, respectively. In a preferred embodiment, the length, width and thickness of the horizontal support member 646 range from about 2200 to 2500 microns, 15 to 25 microns and 15 to 25 microns, respectively.

The bottom T-shaped hinge 614 is coupled to the left support member 606, the right support member 608, and the bottom portion of the mirror collection plate 610. The bottom T-shaped hinge 614 has the same structure as the top T-shaped hinge 612.

Figure 6A:
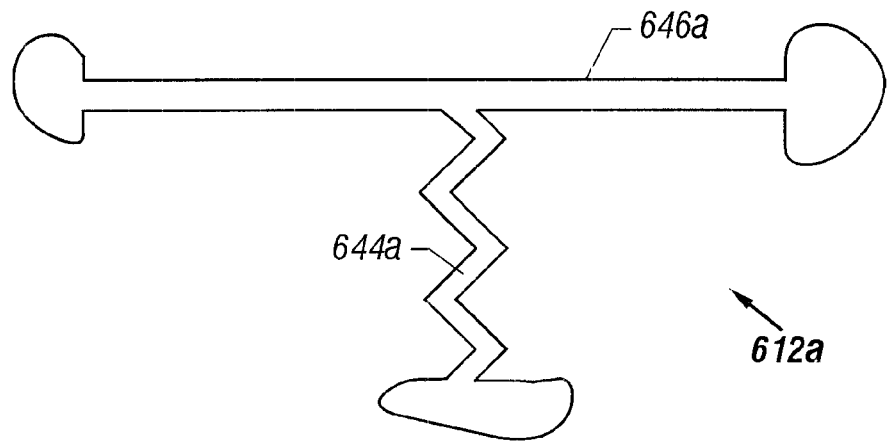
FIG. 6A is a top view of an alternative embodiment of the hinge of the mirror assembly of FIG. 2.
Figure 6B:
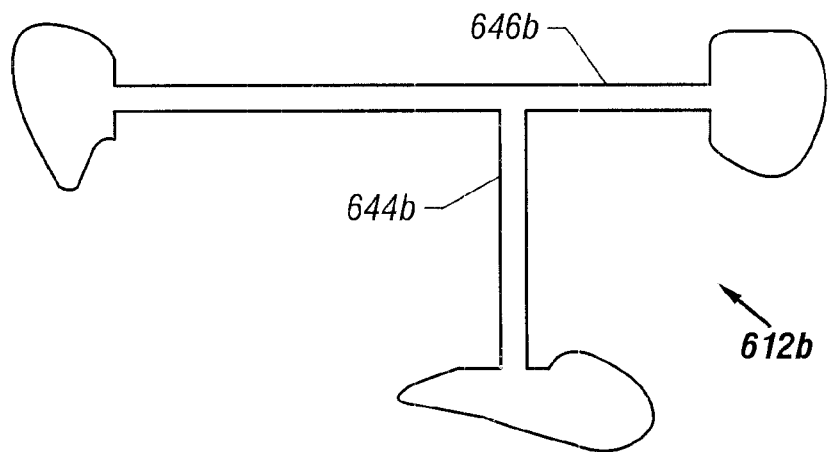
FIG. 6B is a top view of an alternative embodiment of the hinge of the mirror assembly of FIG. 2.
Figure 6C:
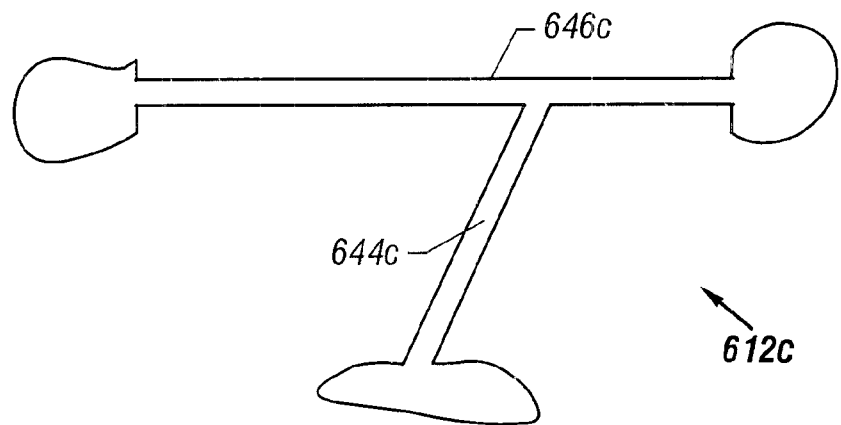
FIG. 6C is a top view of an alternative embodiment of the hinge of the mirror assembly of FIG. 2.

Other embodiments of a T-shaped hinge according to the present invention, as illustrated in FIGS. 6A–6C, provide enhanced sensitivity for sensing acceleration loading conditions. In FIG. 6A, a T-shaped hinge 612A includes a vertical support member 644A having a serpentine shape and a horizontal support member 646A having a substantially linear shape. In FIG. 6B, an alternative embodiment of a T-shaped hinge 612B includes a vertical support member 644B coupled to a horizontal support member 646B at location that is off-center. In FIG. 6C, one or both of the T-shaped hinges 612 and 614 are modified to include a T-shaped hinge 612C having a vertical support member 644C that intersects a horizontal support member 646C at an acute angle and is also coupled to the horizontal support member 646C at location that is off-center.

The top left travel stop 616 extends from and is coupled to the top left portion of the mirror collection plate 610. The top left travel stop 616 preferably limits the motion of the mirror collection plate 610 in the x-direction. The top left travel stop 616 preferably is positioned in the plane of the mirror collection plate 610. In a preferred embodiment, the top left travel stop 616 extends from the mirror collection plate 610 in a substantially orthogonal direction. The thickness of the top left travel stop 616 may range, for example, from about 200 to 600 microns. In a preferred embodiment, the thickness of the top left travel stop 616 ranges from about 250 to 350 microns in order to optimally provide shock protection, and a resilient compact structure having a low mass. The length of the top left travel stop 616 may range, for example, from about 500 to 2000 microns. In a preferred embodiment, the length of the top left travel stop 616 ranges from about 900 to 100 microns. In a particularly preferred embodiment, the top surface of the top left travel stop 616 is planar with the top surface of the mirror collection plate 610. In a particularly preferred embodiment, the bottom surface of the top left travel stop 616 is planar with the bottom surface of the mirror collection plate 610.

The top right and bottom left and right travel stops 618, 620 and 622 are substantially identical to the top left travel stop 616. These travel stops are positioned in corresponding locations about the mirror collection plate 610.

The travel stops, 616, 618, 620 and 622, preferably provide overswing and x-axis shock protection for the mirror collection plate 610 during manufacturing and operation. In a preferred embodiment, the travel stops 616, 618, 620, and 622 are formed as integral parts of the mirror collection plate 610. In a preferred embodiment, the travel stops 616, 618, 620, and 622 provide effective beam lengths greater than about 500 microns and cross sections of about 40,000 microns$^2$ to 240,000 microns$^2$ in order to optimally absorb shock loads of about 2000g/0.5 mS half sine wave input.

The opening 624 preferably permits the mirror collection plate 610 to rotate about the axis 630. The walls 636 of the opening 624 preferably limit movement of the mirror collection plate 610 in the x-direction and the y-directions. The opening 624 preferably includes a top section 638, a middle section 640, and a bottom section 642. The top section 638 of the opening 624 preferably contains the top T-shaped hinge 612 and the top left and right travel stops, 616 and 618. The middle section 640 of the opening 624 preferably contains the mirror collection plate 610. The bottom section 642 of the opening 624 preferably contains the bottom T-shaped hinge 614 and the bottom left and right travel stops, 620 and 622.

The walls of the middle section 640 of the opening 624 may be spaced apart from the opposing edges of the mirror collection plate 610 by a distance ranging, for example, from about 30 to 150 microns. In a preferred embodiment, the walls of the middle section 640 of the opening 624 are spaced apart from the opposing edges of the mirror collection plate 610 by a distance ranging from about 60 to 100 microns in order to optimally minimize movement of the mirror collection plate 610 in the x and y directions. In a preferred embodiment, the gap in the x-direction is different from the gap in the y-direction in order to optimally protect the mirror collection plate 610 from shocks. In a preferred embodiment, the gap between the mirror collection plate 610 and the middle section 640 of the opening 624 provides a spacing in the y-direction ranging from about 15 to 45 microns and a spacing in the x-direction ranging from about 50 to 180 microns in order to optimally limit shock loads on the mirror collection plate 610.

The conductive layer 626 is preferably coupled to the outer periphery of the top surface of the mirror 210. The conductive surface 626 preferably provides a conductive electrical path. The conductive layer 626 may be fabricated from any number of conventional commercially available materials such as, for example, gold, aluminum, or silver. In a preferred embodiment, the conductive layer 626 is fabricated from gold. In a preferred embodiment, the conductive layer 626 is bonded to the underlying substrate by an intermediate layer of titanium.

The mirror 210 may be fabricated from any number of conventional commercially available materials such as, for example, silicon, plated metal or plastic. In a preferred embodiment, the mirror 210 is fabricated by micromachining a silicon wafer using any one, or combination, of the known micro-machining processes.

In a preferred embodiment, the released and free-standing mirror collection plate 610 is connected to the surrounding support frame, 600 by the T-shaped hinges, 612 and 614. In a preferred embodiment, the travel stop fingers, 616, 618, 620 and 622, provide overswing protection for the mirror collection plate 610. In a preferred embodiment, a 200-micron deep anisotropic deep reactive ion etching (DRIE) process is used to form very precise, narrow gaps for X-axis shock protection and Y-axis shock protection, where the mirror collection plate 610 is preferably completely confined within the frame, 602, 604, 606 and 608, for X-axis and Y-axis translational or planar motion i.e. in the planes of the mirrored surface. Persons having ordinary skill in the art and the benefit of the present disclosure will recognize that the term DRIE refers to deep reactive ion etching of a substrate. In a preferred implementation, the DRIE process is provided substantially as disclosed in U.S. Pat. Nos. 5,498,312 and 5,501,893, which are incorporated herein by reference. The T-shaped hinges, 612 and 614, preferably provide the collection plate 610 with optimal translational motion in X-axis and Y-axis directions, in which the mirror collection plate 610 is shock-stopped by the frame, 602, 604, 606 and 608, while also simultaneously maintaining low stress levels within the T-shaped hinges, 612 and 614, to avoid fracture. In a preferred embodiment, the T-shape hinges, 612 and 614, are relatively compliant in the X-axis and Y-axis directions, while they are sufficiently rigid for rotational motion about the axis 630 for establishing the resonant frequency of the mirror collection plate 610.

Thus, in a preferred embodiment of the present invention, the mirror collection plate 610 is supported and suspended by a pair of hinges 612 and 614. These hinges permit torsional movement or rotation of the mirror collection plate 610 about the common hinge axis 630 and movement of the mirror collection in each of the x, y and z direction. The gap or space 648 between the mirror plate 610 and the frame 601 in the y-direction permits movement of the mirror collection plate 610 in the y-direction while the spacing 611 between the stops 616, 618, 620 and 621 and the frame 601 permit movement in the x-direction. The gap 647 provides a hinge compliance in the y-direction. The movements in the x and y directions are sometimes referred to the planar or translational movements and the hinges as springs. The beams 644 and 628 also permit the mirror collection plate 610 to move in the z-direction. The T-hinges provide the necessary compliance to the mirror collection plate motion in the y-direction, which improves the shock tolerance of the hinge to y-axis shock loads generated by the mirror collection plate 610. Prior art typically utilizes a straight-beam hinge, i.e. a beam connected to the frame without a T-member, such as the member 646. Such straight-beam hinges tend to buckle and fracture due to y-axis shock loads. Also, the beams or legs 644 and 648 of the T-hinges 612 and 614 move up in the z-direction due to shock loads. The members 646 and 650 can torsionally rotate, which reduces the stress induced in the 644 and 648 members of the hinges, which stress has been found to be less than the stress induced in the straight-beam hinges. The amount of stress reduction is a function of the "aspect ratio" of the hinges 612 and 614, which is a ratio of the width/thickness.

As illustrated in FIGS. 7–9, the mirror 210 preferably includes portions, 602, 604, 606 and 608, that are full-wafer thickness (e.g., 400 microns), and portions, 610, that are half-wafer thickness (e.g., 200 microns). The cavity 720 in the center of the mirror collection plate 610 is preferably etched 150-microns down from the bottom surface 634 of the mirror collection plate 610, and the T-shape hinges, 612 and 614, are preferably about 8–15 microns thick. The half-thickness mirror collection plate 610 reduces the amount of deep reactive ion etching (DRIE) and also improves the position accuracy of the mirror collection plate 610. The cavity 720, preferably etched in the center of the mirror collection plate 610, is preferably primarily used to improve the position accuracy of the mirror collection plate 610 and reduce the mass of the mirror collection plate 610 without substantially altering the resonant frequency.

The backside of the mirror collection plate 610 preferably includes the Z travel-stops, 710 and 715, that preferably are full-wafer thickness (e.g., 400-microns). Since the mirror collection plate 610, is preferably 200-microns thick, the thicker travel-stops, 710 and 715, optimally maintain the 50-micron gap with the travel-stop fingers, 1010 and 1020, of the bottom cap 215 and, therefore, help provide shock protection in the Z-direction. A mirror collection plate 610 having minimum x-y plane dimensions of about 3-mm×3-mm is preferred.

Figure 6D:
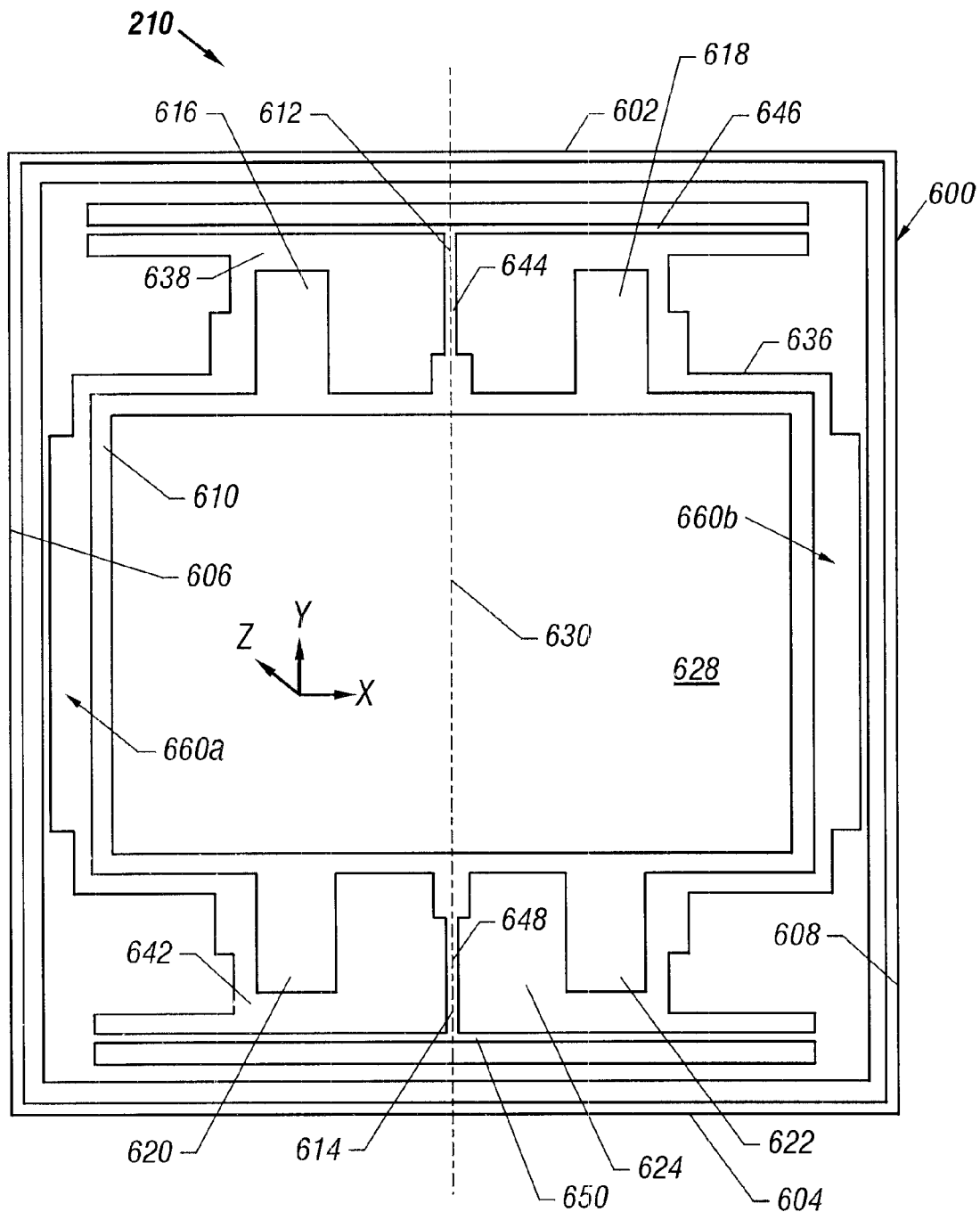
FIG. 6D is a top view of an alternative embodiment of the mirror of the mirror assembly of FIG. 2.

In an alternative embodiment, as illustrated in FIG. 6D, the left and right support members, 606 and 608, of the mirror 210 further include cut-outs, 660A and 660B, positioned on opposite sides of the mirror collection plate 610. In this manner, the amount of viscous damping due to the resistance to the passage of air between the mirror collection plate 610 and the left and right support members, 606 and 608, is reduced. In this manner, the frequency response characteristics of the mirror 210 are enhanced.

Figure 10:
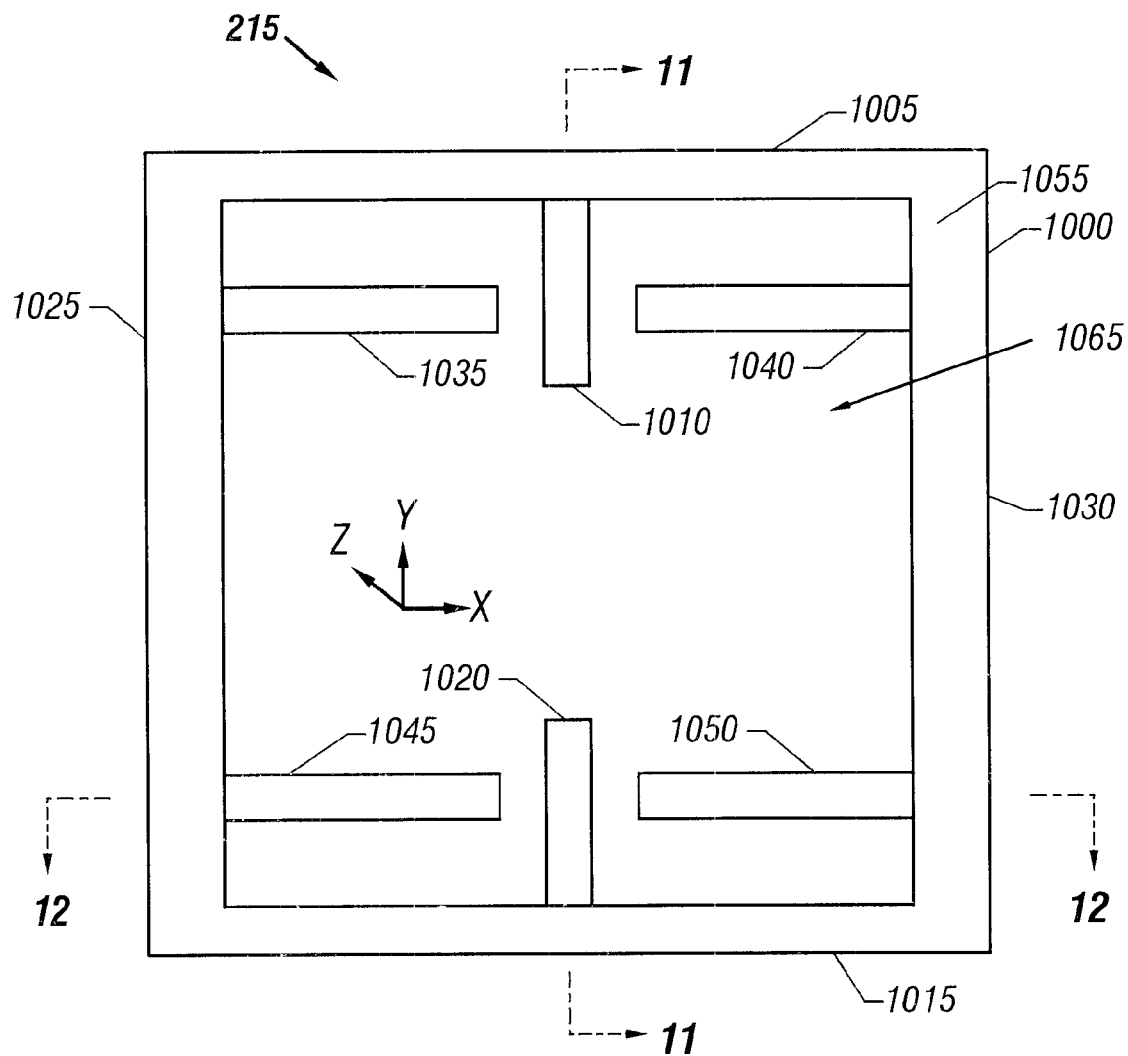
FIG. 10 is a top view of the bottom cap of the mirror assembly of FIG. 2.
Figure 11:
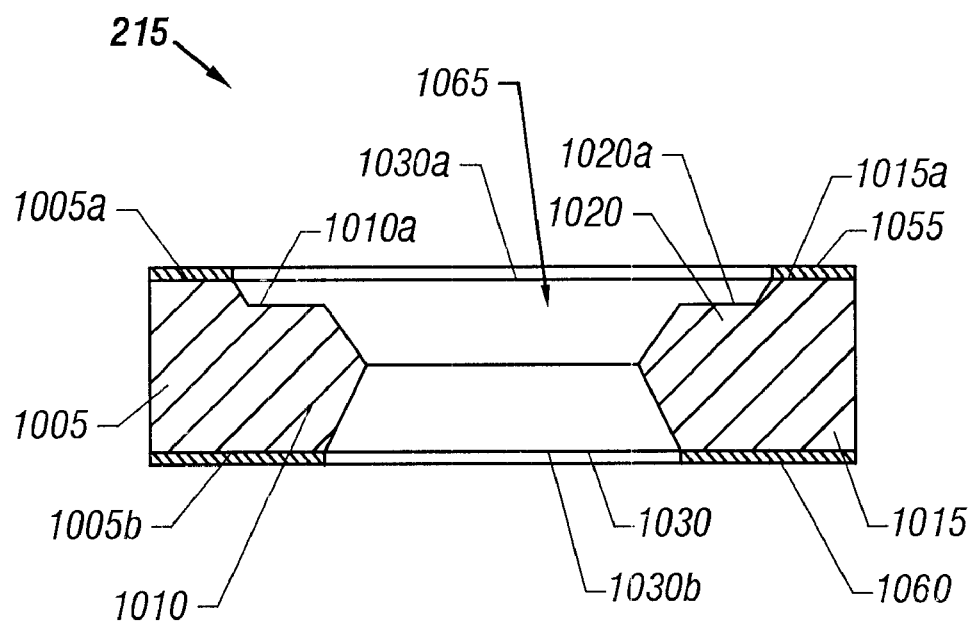
FIG. 11 is a cross-sectional view of the bottom cap of FIG. 10.
Figure 12:
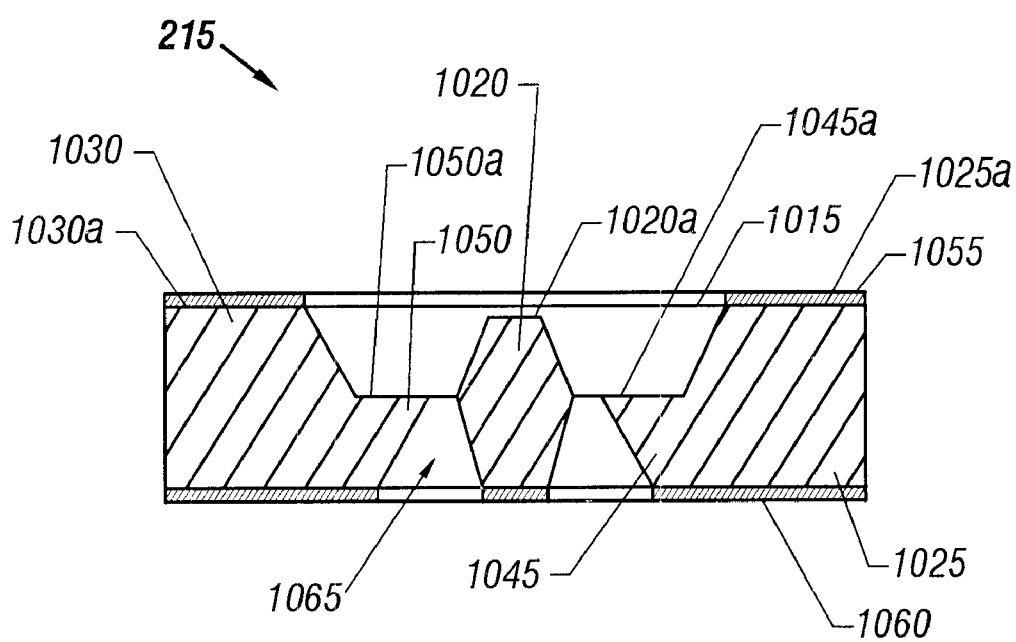
FIG. 12 is a cross-sectional view of the bottom cap of FIG. 10.

As illustrated in FIGS. 10–12, the bottom cap 215 includes a bottom cap frame 1000 to provide support for the bottom cap. The frame 1000 includes support members and top and bottom travel stop members as described above for the top cap and shown in FIG. 3. The bottom cap further comprises an upper left beam 1035, an upper right beam 1040, a lower left beam 1045, a lower right beam 1050, a top conductive surface 1055, a bottom conductive surface 1060, and an opening 1065.

The thickness of the bottom cap frame 1000 may range, for example, from about 400 to 600 microns with preferred thickness ranging from about 400 to 450 microns to provide a compact structure having a low mass.

The top travel stop member 1010 preferably limits the motion of the reflective portion of the mirror 210 in the z-direction. The top travel stop member 1010 preferably extends in a substantially orthogonal direction from the top support member 1005. In a preferred embodiment, the top travel stop member 1010 is positioned within the plane of the top support member 1005. The thickness of the top travel stop member 1010 may range, for example, from about 350 to 550 microns. In a preferred embodiment, the thickness of the top travel stop 1010 ranges from about 350 to 380 microns in order to provide a compact structure having a low mass. In a particularly preferred embodiment, the top surface 1010A of the top travel stop member 1010 is recessed below the level of the top surface 1005A of the top support member 1005. In this manner, the top surface 1010A of the top travel stop 1010 is preferably positioned below the level of the mirror collection plate 610 of the mirror 210. The length of the top travel stop member 1010 may range, for example, from about 1200 to 2800 microns. In a preferred embodiment, the length of the top travel stop member 1010 ranges from about 2000 to 2500 microns. In a particularly preferred embodiment, the length of the top travel stop member 1010 is selected to overlap with the mirror collection plate 610 of the mirror by about 300 microns.

The bottom travel stop member 1020 preferably extends in a substantially orthogonal direction from the bottom support member 1015. The bottom travel stop member 1020 is otherwise substantially identical to the above-described top travel stop member 1010.

The upper left beam 1035 preferably provides support and limits the motion of the mirror collection plate 610 of the mirror 210 in the z-direction during the manufacturing process. In this manner, defective mirrors 210 are protected from shock, catastrophic failure and from falling into the process equipment during the manufacturing process. The upper left beam 1035 preferably extends is a substantially orthogonal direction from the left support member 1025. In a preferred embodiment, the upper left beam 1035 is positioned within the plane of the left support member 1025. The thickness of the upper left beam 1035 may range, for example, from about 150 to 250 microns. In a preferred embodiment, the thickness of the upper left beam 1035 ranges from about 200 to 220 microns in order to optimally provide a compact structure having a low mass. In a particularly preferred embodiment, the top surface of the upper left beam 1035 is recessed below the level of the top surface 1025A of the left support member 1025. In this manner, the top surface of the upper left beam 1035 is preferably positioned below the level of the top left travel stop member 616 of the mirror 210. The length of the upper left beam 1035 may range, for example, from about 1500 to 2200 microns. In a preferred embodiment, the length of the upper left beam 1035 is about 1800 microns.

The upper right and lower left and right beams 1040, 1045 and 1050 are substantially identical to the upper left beam 1035. These beams are positioned within the plane of corresponding support members.

The top conductive surface 1055 is preferably coupled to the outer periphery of the top surface of the bottom cap 215. The top conductive surface 1055 preferably provides a conductive electrical path. The top conductive surface 1055 further preferably provides a bonding ring for subsequent compression bonding of the bottom cap 215 to the mirror 210. The top conductive surface 1055 may be fabricated from any number of conventional commercially available materials such as, for example, gold, aluminum, or silver. In a preferred embodiment, the top conductive surface 1055 is fabricated from gold. In a preferred embodiment, the top conductive surface 1055 is bonded to the bottom cap 215 using an intermediate layer of titanium. The bottom conductive surface 1060 is preferably coupled to the outer periphery of the bottom surface of the bottom cap 215 and is otherwise substantially identical to the top conductive surface 1055.

In a preferred embodiment, the conductive surfaces 1055 and 1060 conformally coat all of the exposed surfaces of the bottom cap 215.

The opening 1065 preferably permits the drive pad electrodes, 1310 and 1315, of the base member 220 to electrostatically drive and capacitatively sense the position of the mirror collection plate 610 of the mirror 210. The opening 1065 preferably comprises a substantially rectangular opening of greater size than the mirror collection plate 610 of the mirror 210.

Figure 13:
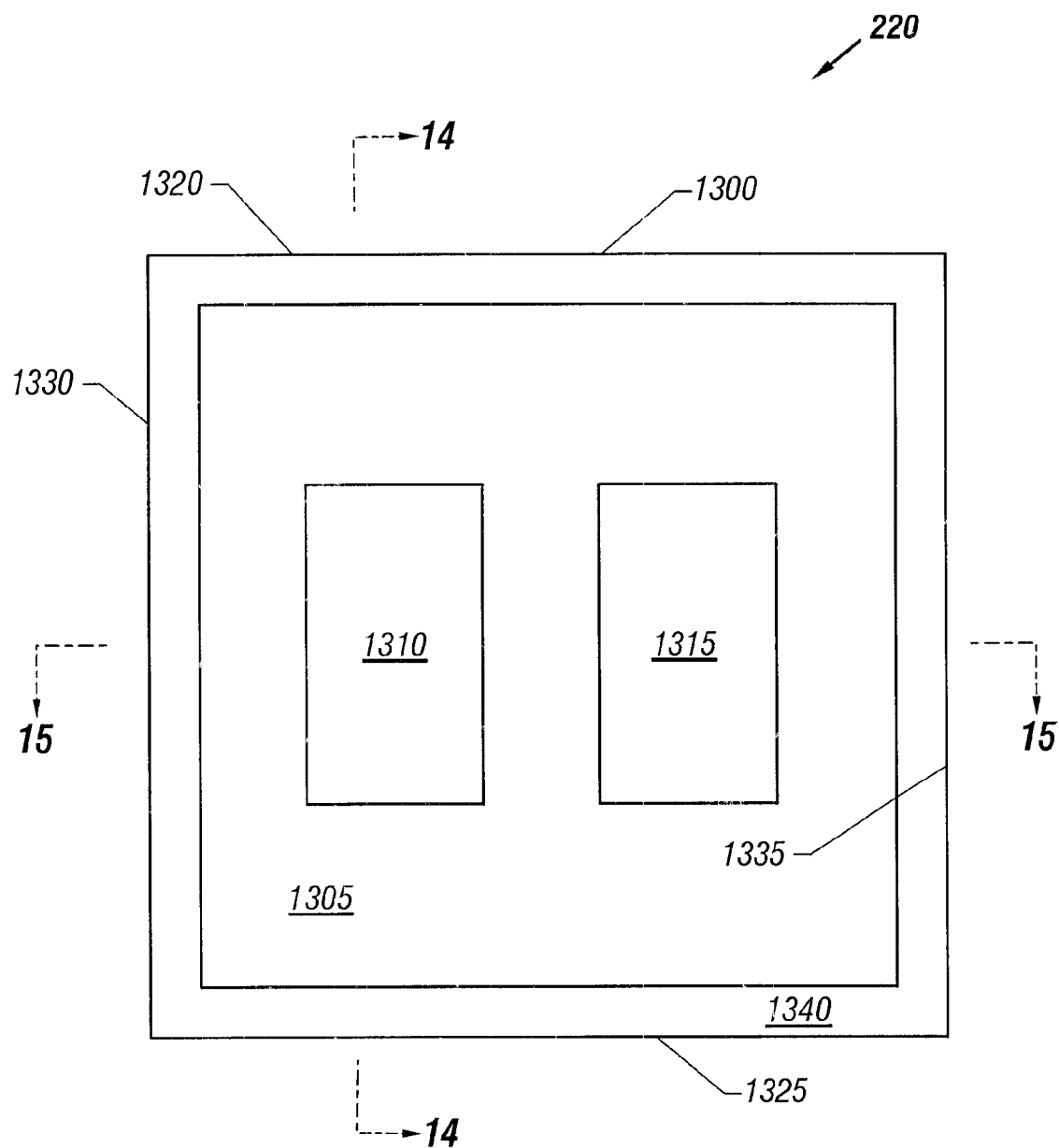
FIG. 13 is a top view of the base member of the mirror assembly of FIG. 2.
Figure 14:
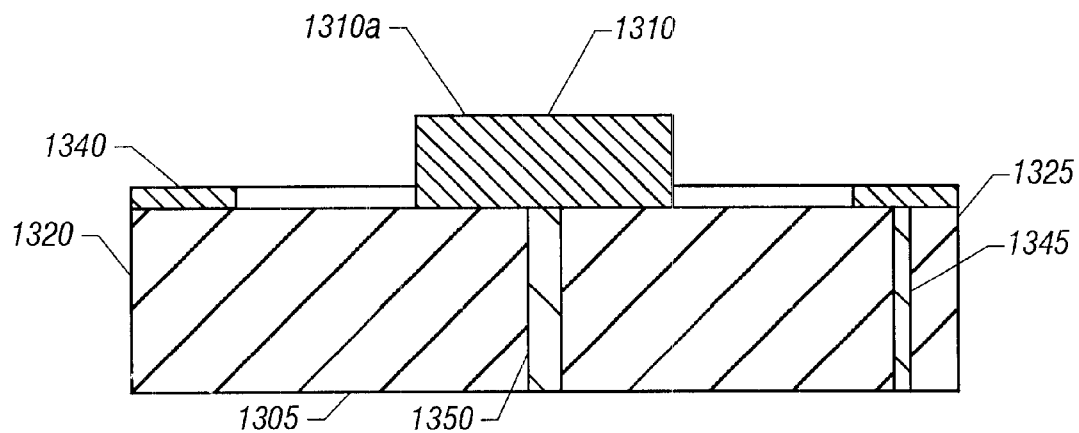
FIG. 14 is a cross-sectional view of the base member of FIG. 13.
Figure 15:
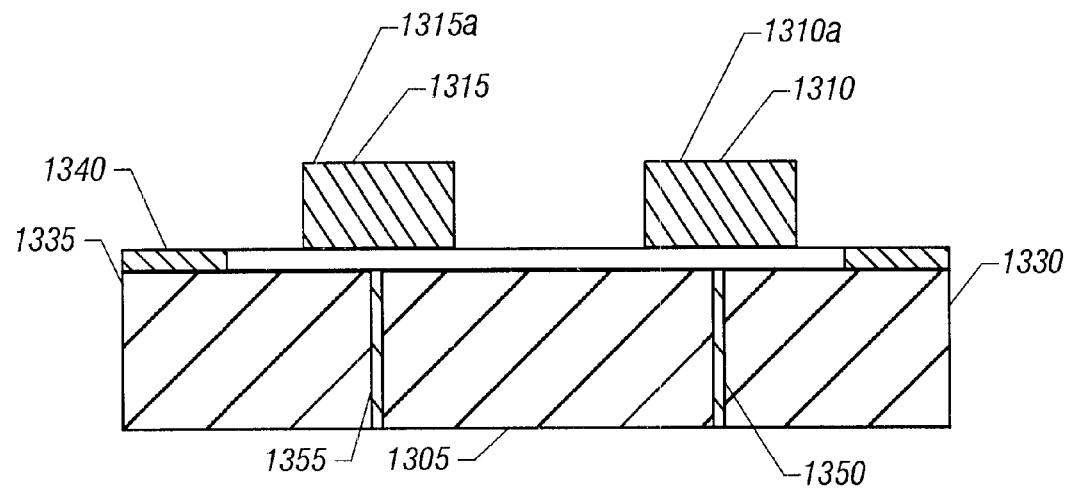
FIG. 15 is a cross-sectional view of the base member of FIG. 13.

As illustrated in FIGS. 13–15, in a preferred embodiment, the base member 220 includes a bottom plate 1305, a left drive pad electrode 1310, a right drive pad electrode 1315, a frame 1300, a conductive layer 1340, and conductive paths 1345, 1350 and 1355.

The bottom plate 1305, and frame 1300 together provide structural support for the base member 220. The base member 220 preferably supports the bottom cap 215, mirror 210 and the top cap 205.

The bottom plate 1305 preferably comprises a solid member fabricated from any number of conventional commercially available materials such as, for example, ceramic, silicon or glass. In a preferred embodiment, the thickness of the bottom plate 1305 ranges from about 200 to 400 microns.

The left drive pad electrode 1310 is coupled to the bottom plate 1305. The left drive pad electrode 1310 preferably permits the mirror collection plate 610 of the mirror 210 to be driven using electrostatic force and/or the position of the mirror collection plate 610 of the mirror 210 to be capacitively sensed. In this manner, the mirror collection plate 610 of the mirror 210 oscillates about the axis 630. In a preferred embodiment, the left drive pad electrode 1310 includes a conductive layer 1310A that is coupled to the conductive path 1350. In this manner, an electrical connection can be provided to the conductive layer 1310A. The conductive layer 1310A may be fabricated from any number of conventional commercially available materials such as, for example, metal, polysilicon or conductive epoxy. In a preferred embodiment, the conductive layer 1310A is fabricated from metal.

The left drive pad electrode 1310 may have a top surface area ranging, for example, from about $3 \times 10^6$ to $10 \times 10^6$ microns.$^2$ In a preferred embodiment, the top surface area of the left drive pad electrode 1310 is about $4.5 \times 10^6$ microns$^2$ in order to optimally drive the mirror collection plate 610 of the mirror 210. The left drive pad electrode 1310 preferably extends from the bottom plate 1305 in a substantially orthogonal direction. The left drive pad electrode 1310 may extend from the bottom plate 1305 for a distance ranging, for example, from about 50 to 200 microns. In a preferred embodiment, the left drive pad electrode 1310 extends from the bottom plate 1305 for a distance ranging from about 50 to 100 microns. In a particularly preferred embodiment, gap between the top of the left drive pad electrode 1310 and the bottom of the mirror collection plate 610 of the mirror 210 ranges from about 300 to 400 microns.

The right drive pad electrode 1315 is substantially identical to the left pad electrode 1310. In a preferred embodiment, the left and right drive pad electrodes, 1310 and 1315, are positioned substantially equidistant from the axis 630.

The top support member 1320 is coupled to the bottom plate 1305, the left support member 1330, the right support member 1335 and the conductive layer 1340. The top support member 1320 may have a length, width and height ranging, for example, from about 4000 to 6000 microns, 400 to 600 microns, and 400 to 600 microns. In a preferred embodiment, the top support member 1320 length, width and height are about 4900 microns, 375 microns, and 400 microns.

The left support member 1330 is coupled to the bottom plate 1305, the top support member 1320, the bottom support member 1325 and the conductive layer 1340. The left support member 1330 may have a length, width and height ranging, for example, from about 6000 to 9000 microns, 400 to 600 microns, and 400 to 600 microns. In a preferred embodiment, the left support member 1330 length, width and height are about 6800 microns, 375 microns, and 400 microns.

The bottom support member 1325 is substantially identical to the top support member 1320 and the right support member 1335 is substantially identical to the left support member 1330.

In a preferred embodiment, the bottom plate 1305, the top support member 1320, the bottom support member 1325, the left support member 1330, and the right support member 1335 are integrally formed.

The conductive layer 1340 preferably extends around the periphery of the top surface of the base member 220. The conductive layer 1340 preferably provides a conductive electric path for use in actuating the mirror collection plate 610 of the mirror 210. The conductive layer 220 may be fabricated from any number of conventional commercially available materials such as, for example, metal, polysilicon or conductive epoxy. In a preferred embodiment, the conductive layer 1340 is fabricated from gold. The conductive layer 1340 may be coupled to the conductive path 1345 using conventional methods.

The base member 220 may be fabricated from any number of conventional commercially available materials such as, for example, ceramic, silicon or glass using any number of conventional fabrication processes.

The base 220 preferably provides electrode access to the mirror collection plate 610 for electrostatic actuation and capacitive position sensing using drive pad electrodes, 1310 and 1315. The design and operation of the electrostatic actuation and capacitive position sensing are well known in the art.

The metal ring 1340 around the perimeter of the base member 220, in combination with conductive-epoxy bonding of the base member 220 to the bottom cap 215, preferably provides electrical contact between the base member 220 and the bottom cap 215. In a preferred embodiment, the wafer bonding process preferably allows the bottom cap 215 to be in direct electrical contact with the mirror collection plate 610. Consequently, the mirror collection plate 610 preferably can be electrically accessed, controlled, and monitored using the base member 220. The electrode drive pad and mirror contact metallization, 1310A, 1315A, and 1340, on the base member 220 are preferably connected to electrical contact pads on the backside of the base member 220, utilizing conventional thick-film through-hole via technology, which effectively makes the mirror assembly 110 a surface-mount component.

Figure 16:
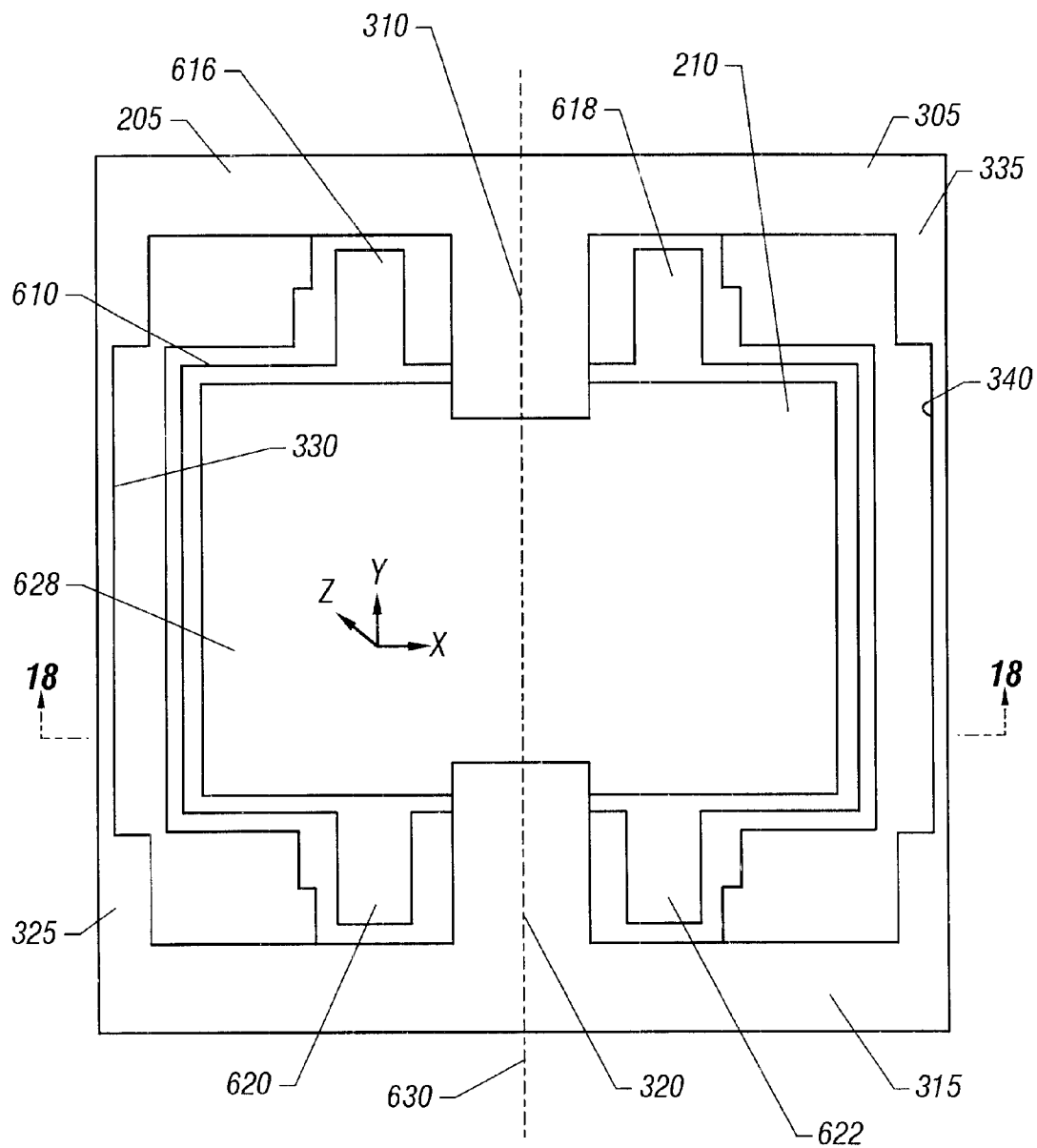
FIG. 16 is a top view of the top cap and mirror of the mirror assembly of FIG. 2.

Referring now to FIG. 16, a sub-assembly including the top cap 205 and the mirror 210 is illustrated. As illustrated in FIG. 16, the travel stops, 310 and 320, of the top cap 205 protect the mirror collection plate 610 from z-axis shock while also minimizing the shadowing/overlapping of the reflective surface 628 of the mirror collection plate 610. Furthermore, the side rim cut-outs, 330 and 340, of the top cap 205 maximize the optical path to the reflective surface 628 of the mirror collection plate 610.

Figure 17:
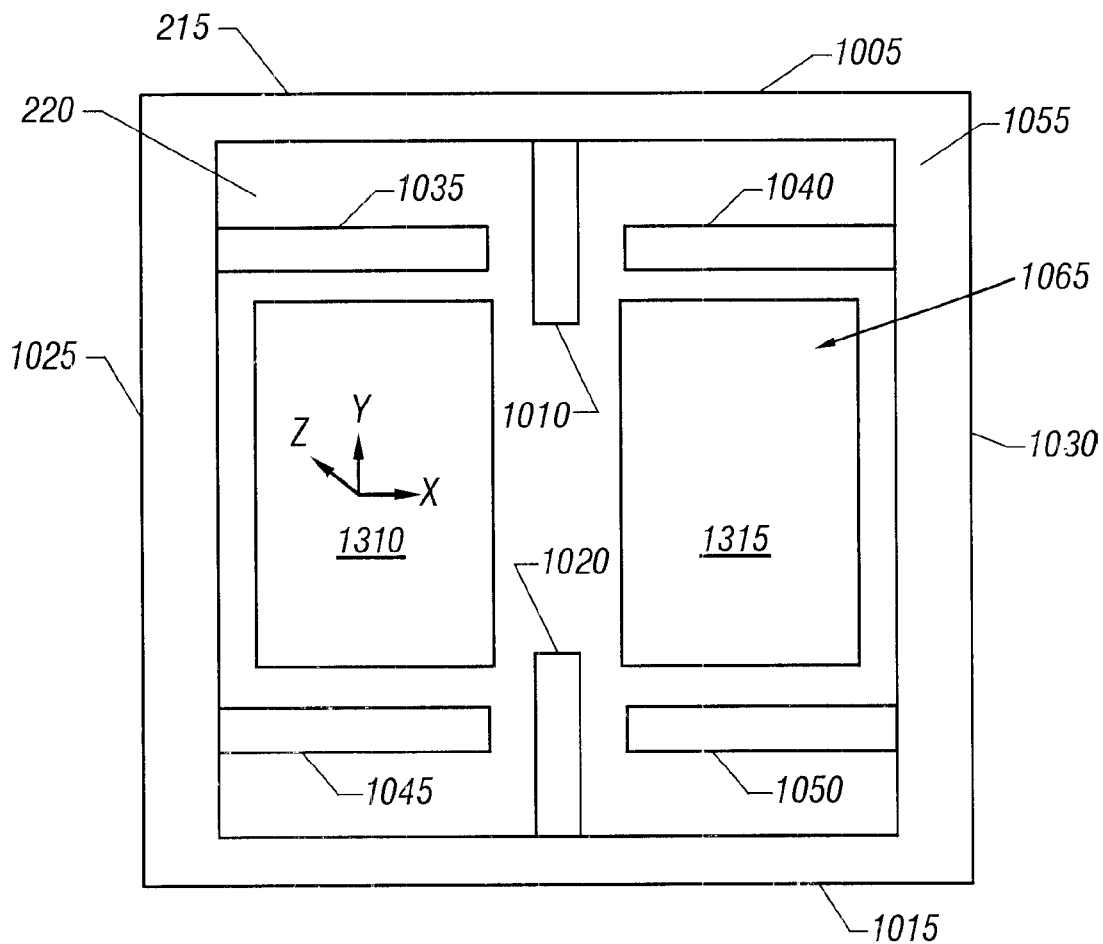
FIG. 17 is a top view of the bottom cap and base member of the mirror assembly FIG. 2.

Referring now to FIG. 17, a sub-assembly including the bottom cap 215 and the base member 220 is illustrated. As illustrated in FIG. 17, the travel stop fingers, 1010 and 1020, protect the mirror collection plate 610 from z-axis shock while also maximizing the drive area of the drive pad electrodes, 1310 and 1315.

Figure 18:
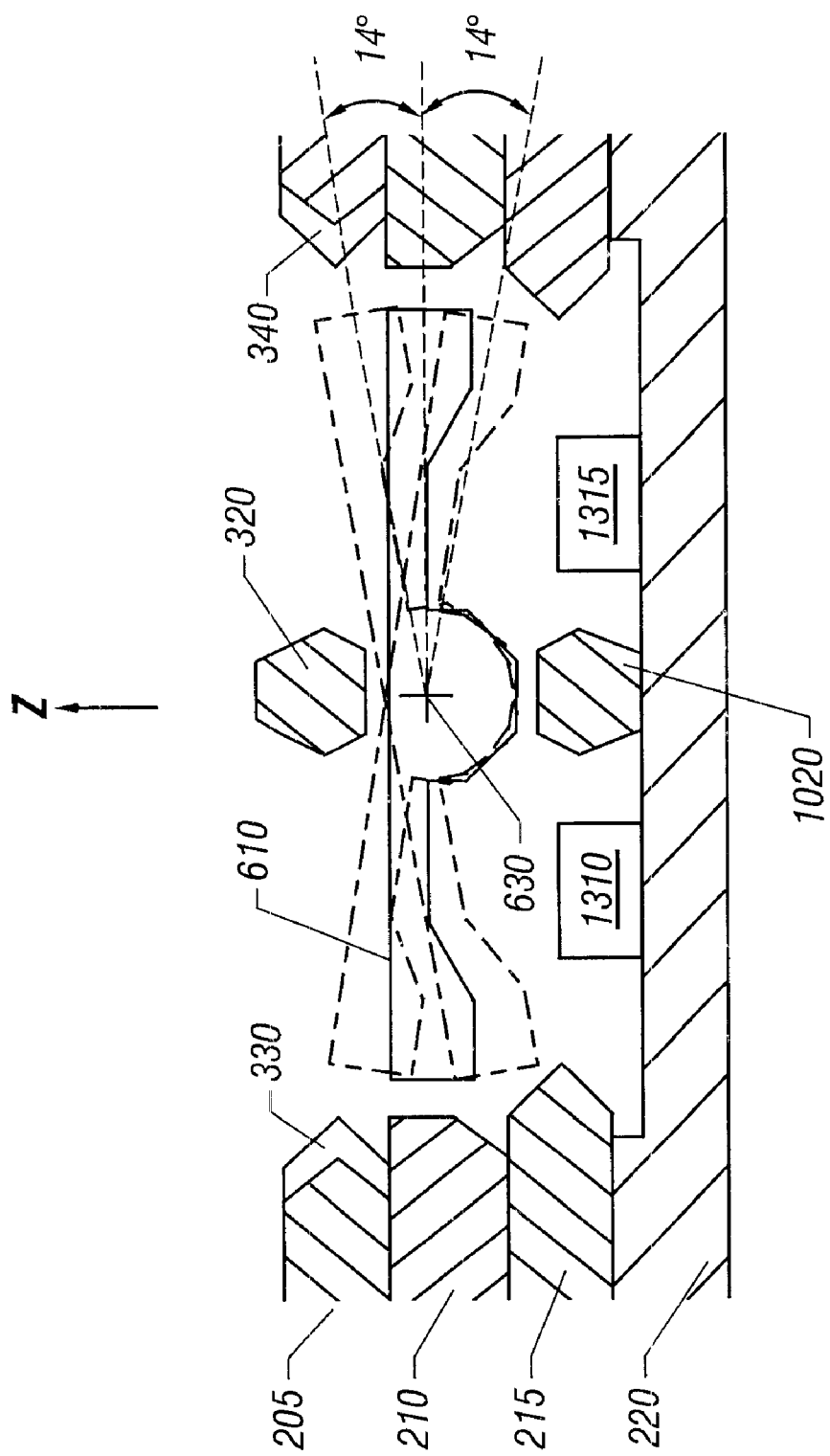
FIG 18 is a cross-sectional view of the mirror assembly of FIG. 16 illustrating the oscillation of the mirror collection plate.

Referring now to FIG. 18, additional shock protection features of the mirror assembly 110 will be described. As illustrated in FIG. 18, preferably all of the interior walls of the top cap 205 and bottom cap 215 include tapered walls. In a preferred embodiment, the mirror collection plate 610 may be rotated out of plane by about 14° in both directions. In a preferred embodiment, the clearance between the mirror collection plate 610 and the interior walls of the top cap 205, bottom cap 215, and the support structure of the mirror 210 is about 60±10 microns for rotation ranging from −14° to +14°. As also illustrated in FIG. 18, the travel stops, 320 and 1020, protect the mirror collection plate 610 from z-axis shocks. In a preferred embodiment, the clearance between the mirror collection plate 610 and the travel stops, 320 and 1020, is about 20–60 microns.

The travel stop fingers 310 and 320 dimensions are chosen to make them sufficiently compliant in the z-direction to dissipate the Z-axis shock impact energy of the mirror hitting (urging) the travel-stop fingers. This compliancy provides a shock energy dissipation factor (not comprehended in the prior art) makes the resulting mirror assembly more robust to shock loads. The travel-stop fingers 616, 618, 620, and 626 are similarly made to have sufficient compliance in the x-direction to dissipate X-axis shock impact of the mirror plate hitting frame 600.

As illustrated in FIG. 18, the travel-stop fingers, 310 and 320, of the top cap 205 protect the mirror 210 from Z-axis shock while minimizing the shadowing/overlap of the mirror collection plate 610, thus providing the external laser optical access to the micromirror. The travel-stop fingers, 310 and 320, are preferably recessed about 20–60 microns from the surfaces of the top cap 205, which preferably sets the gap between the mirror collection plate 610 and the travel-stop fingers, 310 and 320, to be about 20–60 microns in the Z-direction. The tapered walls around the inside perimeter of the top cap 205 are preferably for capturing the mirror collection plate 610 during an input shock while the mirror collection plate 610 is rotated out-of-plane. The left and right rim cut-outs, 330 and 340, in the top cap 205 preferably provide clipping reduction. The travel-stop fingers, 1010 and 1020, of the bottom cap 215 preferably protect the mirror collection plate 610 from Z-axis shock while maximizing the area of the drive pad electrodes, 1310 and 1315. The travel-stop finger arrangement of the top and bottom caps, 205 and 215, preferably constrain the mirror collection plate 610 from Z-axis translational motion, while promoting torsional rotation of the mirror collection plate 610 about the axis 630. The bottom cap 215 also preferably includes the beams, 1025, 1040, 1045, and 1050, for facilitating the handling of defective mirrors during the fabrication process.

As illustrated in FIGS. 6, 6A, 6B and 6C, the design of the T-shaped hinges 612 and 614, decouples the rotational spring constants from the translational spring constants. In this manner, the mirror collection plate 610 is optimally protected from vibration and shock loads.

Figure 19:
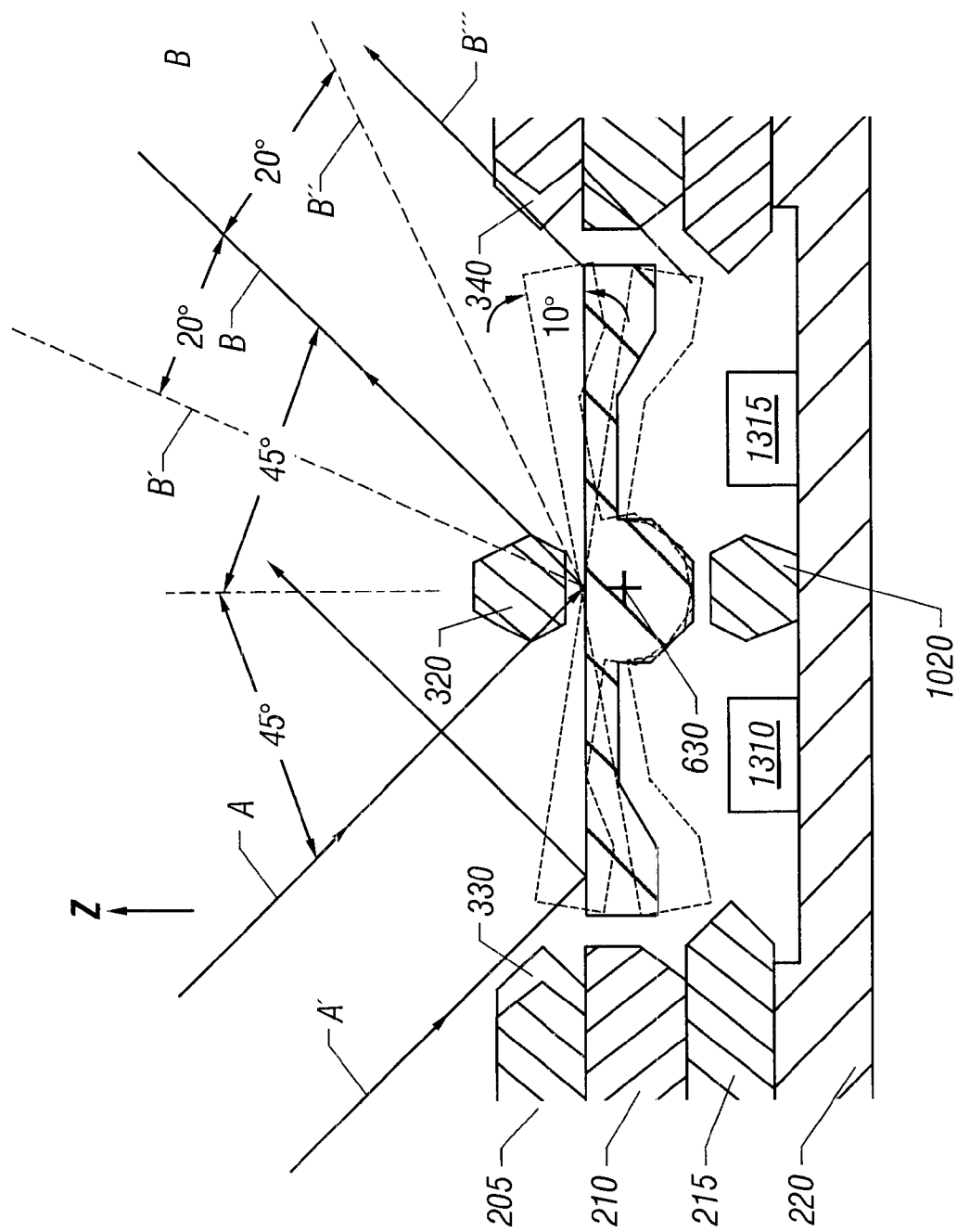
FIG. 19 is a view of the mirror assembly of FIG. 18 illustrating the use of tapered surfaces to minimize clipping of the laser light.

Referring now to FIG. 19, additional features of the mirror assembly 110 for optimizing the reflection of incident laser beams will be described. In an exemplary application of the sensor assembly 110, an incident laser beam A is directed to the mirror collection plate 610 at an angle of 45° and results in the reflected beam B. For a scanning range of ±10, the reflected laser beams are bound by the rays B' and B. In order to avoid laser beam clipping, the tapered walls and rim cut-outs, 330 and 340, of the top cap 205 minimize clipping of the incident and reflected laser beams. These features are particularly advantageous in the situation where the incident laser beam is displaced resulting in the incident laser beam A' or the reflected laser beam B .

As illustrated in FIGS. 18 and 19, the tapered walls of the bottom cap 215 provide optimal shock protection to the mirror collection plate 610, and the tapered walls of the top cap 205 minimize clipping of the incident and reflected laser beams. The rim cut-outs, 330 and 340, of the top cap 205 further minimize shadowing and clipping of the incident and reflected laser beams.

Figure 20A:
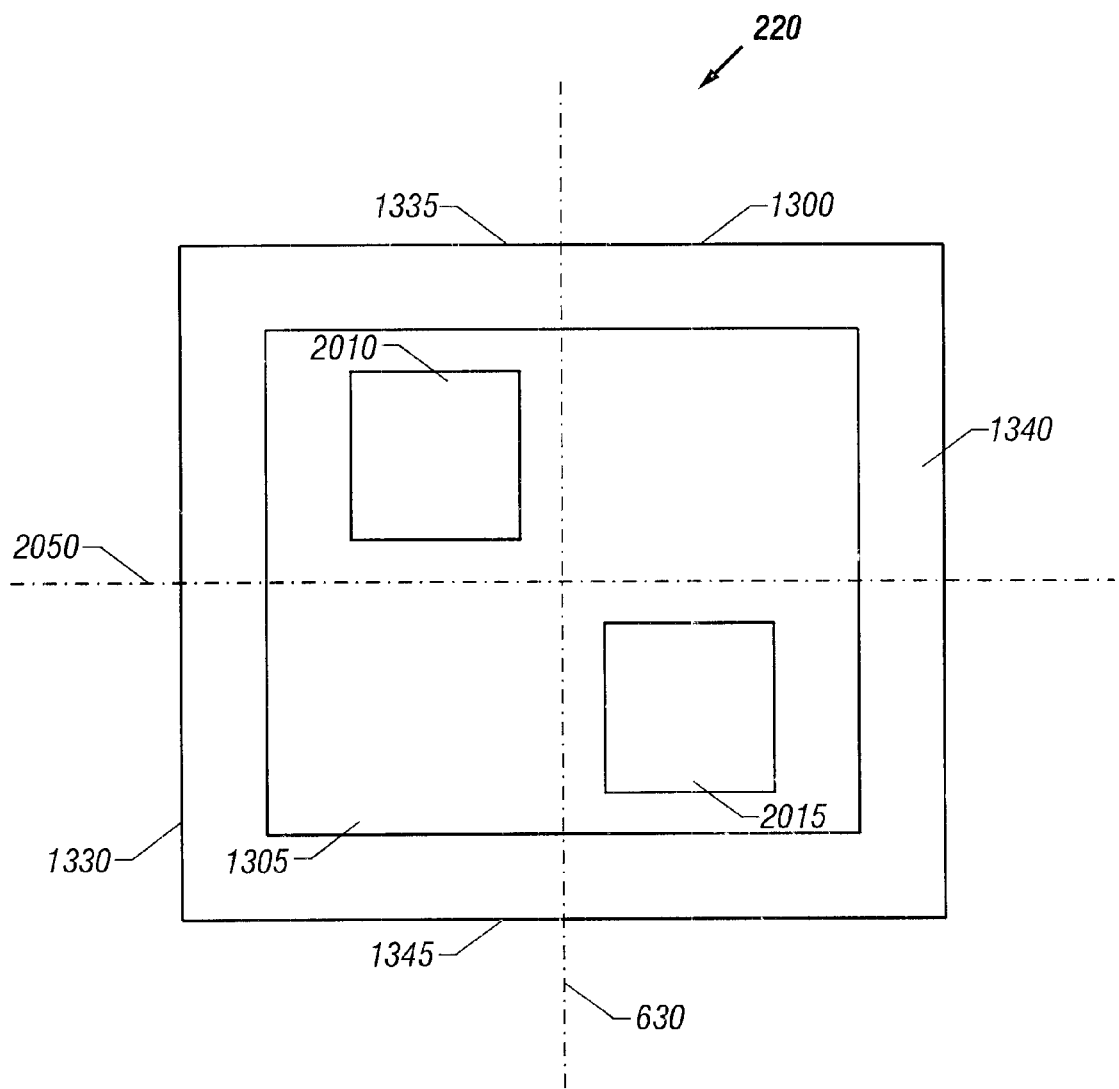
FIGS. 20A–20B show embodiments of the present invention capable of dual axis operation.
Figure 20B:
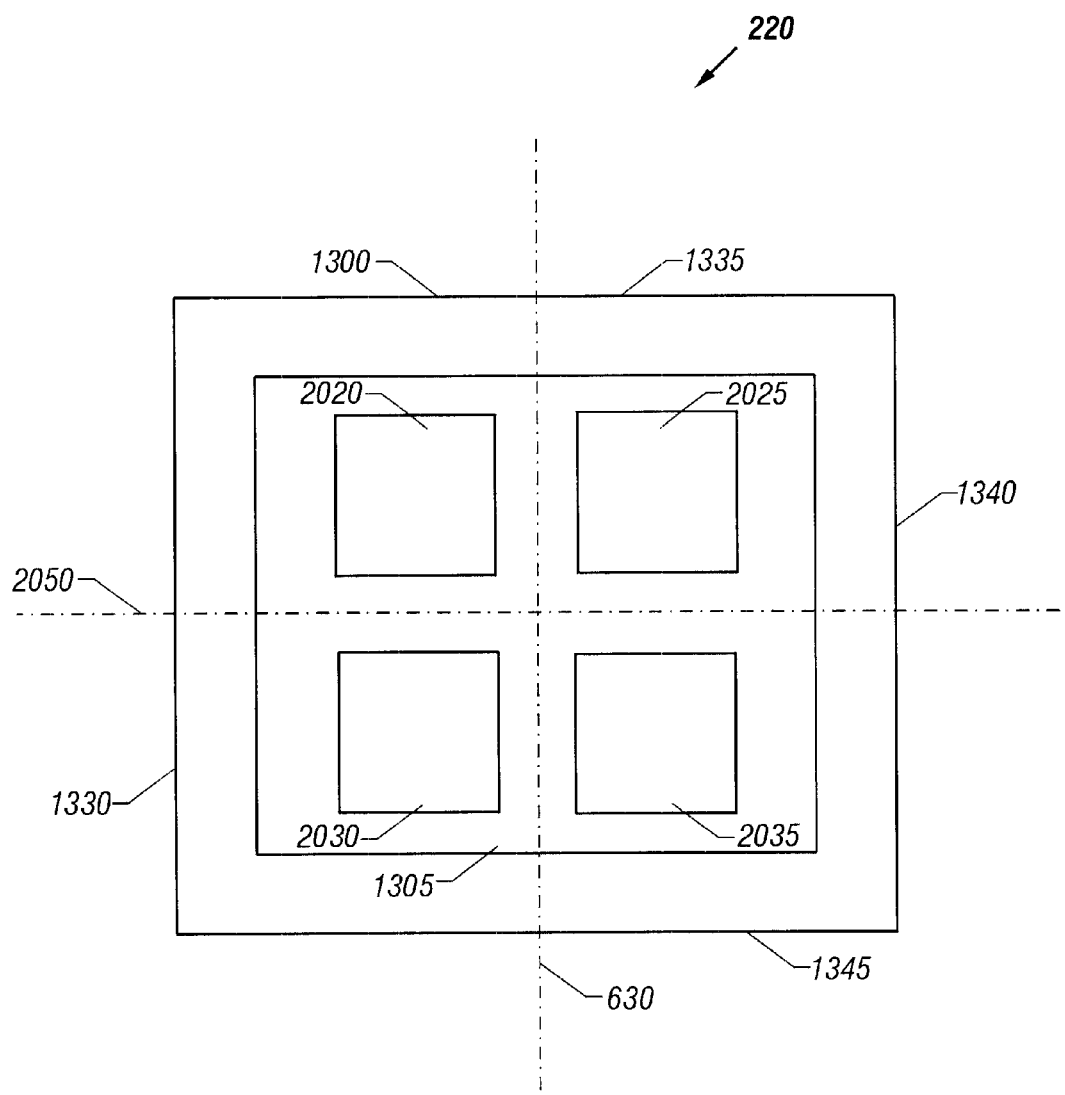

Alternatively, the present invention provides an apparatus capable of rotating a mass such as the mirror collection plate 610 about two distinct axes of rotation ("dual axis operation") using a single pair of T-shaped hinges. A base member that may be used for dual axis operation is substantially as described above and shown as reference numeral 220 in FIGS. 13–15. Alternative embodiments for dual axis operation base members, are illustrated in FIGS. 20A and 20B. For brevity, components in FIGS. 20A and 20B substantially identical to components previously described are numbered according to the previously described components and will not be described in detail in this embodiment. One skilled in the art would readily understand that all variations of the invention described above are equally applicable to the following embodiments.

In FIG. 20A, the base member 220 includes a bottom plate 1305, a left drive pad electrode 2010, a right drive pad electrode 2015, a frame 1300, a conductive layer 1340. A top support member 1320 is coupled to the bottom plate 1305, the left support member 1330, the right support member 1335 and the conductive layer 1340. A bottom support member 1325 is coupled to the bottom plate 1305, the left support member 1330, the right support member 1335 and the conductive layer 1340.

As shown, the left drive electrode 2010 and the right drive electrode 2015 are diagonally disposed on the bottom plate 1305. The left and right drive pad electrodes 2010 and 2015 permit the mirror collection plate 610 of the mirror 210 to be driven using electrostatic force and/or the position of the mirror collection plate 610 of the mirror 210 to be capacitively sensed. In this manner, the mirror collection plate 610 of the mirror 210 oscillates about a primary axis and about a secondary axis (see FIGS. 21A–C).

FIG. 20B is a base member 220 substantially similar to the base member described above and shown in FIG. 20A. In an alternative embodiment using the base member 220 of FIG. 20B for dual axis operation, multiple drive electrodes are disposed on the bottom plate 1305. Shown are four electrodes 2020, 2025, 2030 and 2035. Controlling electrical charge on these electrodes will control rotation of the mirror collection plate about the primary and secondary axes.

Figure 21A:
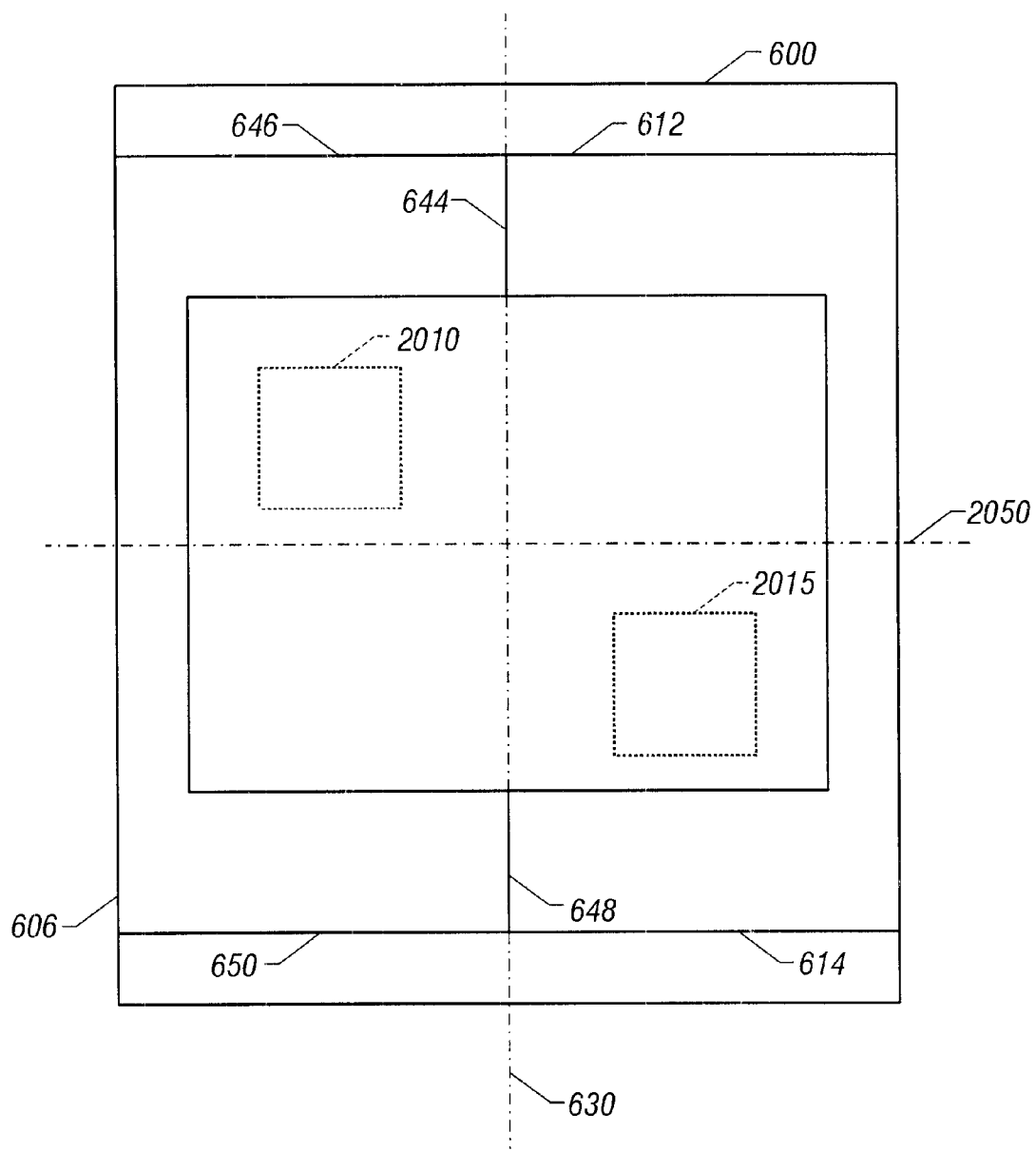
FIGS. 21A–21C are schematic representations of a mirror in dual axis operation.
Figure 21B:
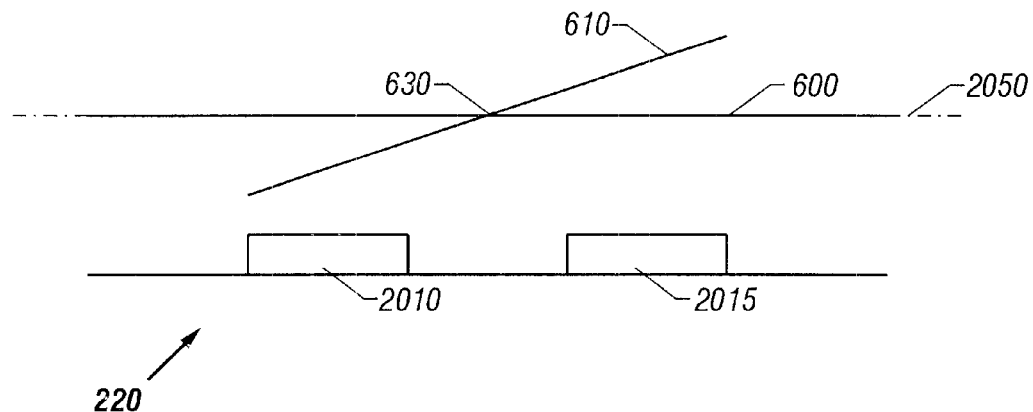
Figure 21C:
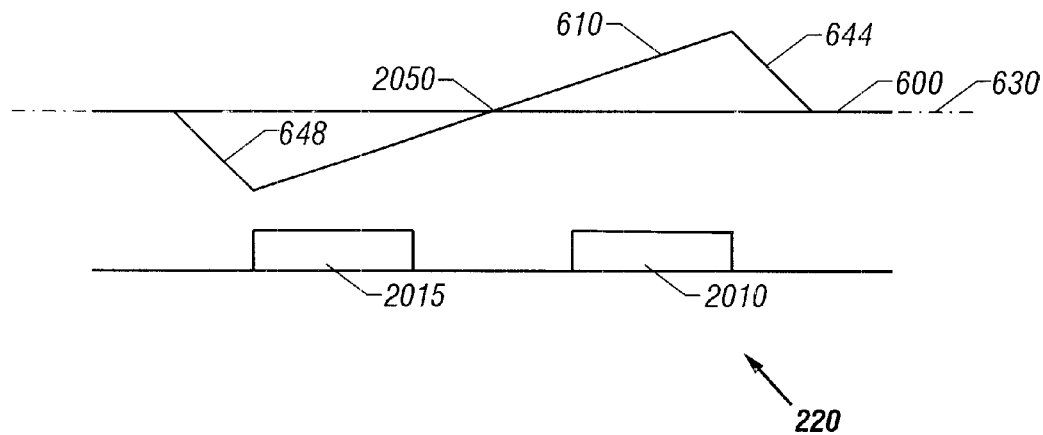

Referring now to FIGS. 21A–21C, schematic representations of the base member 220 are shown in top (FIG. 21A) and side (FIGS. 21B–21C) views to illustrate the dual axis operation. The mirror collection plate 610 includes a primary axis of rotation 630 that is co-linear with the legs 644 and 648 of the T-shaped hinges 612 and 614. A secondary axis of rotation 2050 is made possible by torsional and translational movement of the horizontal members 646 and 650 that result from bending movement of the legs 644 and 648. FIG. 21B shows the mirror collection plate rotating about the primary axis 630, and FIG. 21C shows the mirror collection plate rotating about the secondary axis 2050.

For the secondary axis of rotation, the previously-described torsional and translational movements of the horizontal members 646 and 650 provide more mechanical degrees-of-freedom at the interface with the legs 644 and 648, which results in performance improvements in terms of: (1) reducing the bending-movement induced material stress within the legs 644 and 648 which reduces component fatigue/failure and enables large angles of rotation to be achieved; and (2) providing a larger degree of rotational angle about the secondary axis per unit of driving force (e.g. electrostatic or magnetic).

A method of rotating a mass having a single pair of hinges about a primary axis and a secondary axis is within the scope of the present invention. Using the structure of the present invention as described above and shown in FIGS. 20A–21C, a mass can be rotated about two distinct axes. In one embodiment, electrical charge on drive pad electrodes 2010 and 2015 is controlled to create two orthogonal axes of rotation. In another embodiment, the axes of rotation are not orthogonal.

In one embodiment controlling the electrical charge to each electrode 2020 through 2035 is performed independently to allow independent rotation about the axes of rotation to enable rotation of a surface of the mass to a desired orientation.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. An apparatus for supporting a mass, comprising;
   (a) a mass having a first axis and a second axis of rotation;
   (b) a pair of T-shaped hinges attached to a support structure supporting said mass, each T-shaped hinge having a first leg member attached to the mass and a T-member attached to the leg and to the support structure at opposite ends of the T-member, said T-member and leg member capable of torsional and translational movement;
   (c) at least two devices operatively associated with the mass and located to apply force to the mass, the force capable of rotating the mass about the first and second axes,
   wherein the T-shaped hinges allow for the mass vertical movement, movement along a first planar direction and movement along a second planar direction, wherein said vertical, first and second planar directions are orthogonal to each other.

2. The apparatus of claim 1, wherein the mass further comprises a reflective surface.

3. The apparatus of claim 1 further comprising at least one x-travel stop limiting movement of the mass in the first planar direction.

4. The apparatus of claim 3, wherein the at least one x-travel stop includes a first member carried by the support structure and a second member carried by the mass.

5. The apparatus of claim 4, wherein the mass has a plurality of sides and wherein the at least one x-travel stop includes a separate travel stop corresponding to each said side of the mass.

6. The apparatus of claim 3 further comprising at least one y-travel stop limiting movement of the mass in the second planar direction.

7. The apparatus of claim 6, wherein at least one y-travel stop includes a member carried by the support structure that limits the movement of the mass in the second planar direction.

8. The apparatus of claim 6, wherein the mass has a plurality of sides and at least one y-travel stop includes a separate member carried by the support structure to limit movement of the mass along each said side of the mass.

9. The apparatus of claim 1 further comprising a first planar stop to limit movement of the mass in the first planar direction and a second planar stop to limit the movement of the mass in the second planar direction.

10. The apparatus of claim 9, wherein the first planar stop includes a first member carried by the support structure and a second member carried by the mass which cooperate with each other to limit travel of the mass in the first planar direction and the second planar stop includes a member carried by the mass that limits travel of the mass in the second planar directions.

11. The apparatus of claim 1 further comprising a vertical travel stop that limits the movement of the mass in the vertical direction that is perpendicular to the a surface of the mass.

12. The apparatus of claim 11, wherein the vertical travel stop includes a separate finger member placed a predetermined distance from each said T-shaped hinge, each said finger member having length greater than a planar dimensions of the T-shaped hinges.

13. The apparatus of claim 1, wherein each said hinge has a predetermined torsional spring constant and a translational spring constant wherein the torsional spring constant is decoupled from the translational spring constant.

14. The apparatus of claim 1, wherein the leg member is perpendicular to the T-member in one or more of the T-shaped hinges.

15. The apparatus of claim 1, wherein leg member is serpentine in one or more of the T-shaped hinges.

16. The apparatus of claim 1, wherein the leg member is offset from the center of the T-member in one or more of the T-shaped hinges.

17. The apparatus of claim 1, wherein the leg member intersects the T-member at an acute angle in one or more of the T-shaped hinges.

18. A method for supporting a mass, comprising;
   (a) supporting the mass with a pair of T-shaped hinges attached to a support structure, each T-shaped hinge having a first leg member attached to the mass and a T-member attached to the leg and to the support structure at opposite ends of the T-member, said T-member and leg member capable of torsional and translational movement, wherein the T-shaped hinges allow for the mass vertical movement, movement along a first planar direction and movement along a second planar direction, wherein said vertical, first and second planar directions are orthogonal to each other; and
   (b) oscillating the mass about a first axis with at least two devices capable of applying force to the mass; and
   (c) oscillating the mass about a second axis with the at least two devices.

19. The method of claim 18, wherein the mass further comprises a reflective surface.

20. The method of claim 18 further comprising limiting movement of the mass in the first planar direction using at least one x-travel stop.

21. The method of claim 20, wherein the at least one x-travel stop includes a first member carried by the support structure and a second member carried by the mass.

22. The method of claim 20 further comprising limiting movement of the mass in the second planar direction using at least one y-travel stop.

23. The method of claim 22, wherein the mass has a plurality of sides and the at least one y-travel stop includes a separate member carried by the support structure, the method further comprising limiting movement of the mass along each said side of the mass using the plurality of sides and the separate member.

24. The method of claim 18, wherein the support structure further comprises a vertical travel stop, the method further comprising limiting movement of the mass in the vertical direction that is perpendicular to a surface of the mass using the vertical stop.

25. The method of claim 18, wherein the first axis is perpendicular to the second axis.

* * * * *